US012542867B2

(12) United States Patent
Andresen et al.

(10) Patent No.: US 12,542,867 B2
(45) Date of Patent: Feb. 3, 2026

(54) VIDEO STREAM MANIPULATION

(71) Applicant: Neatframe Limited, London (GB)

(72) Inventors: Simen Andresen, Fornebu (NO); Anh Duc Dao, Fornebu (NO); Stian Selnes, Fornebu (NO); Håkon Skramstad, Fornebu (NO); Ivar Johnsrud, Fornebu (NO); Simen Teigre, Fornebu (NO)

(73) Assignee: Neatframe Limited, London (GB)

( * ) Notice: Subject to any disclaimer, the term of this patent is extended or adjusted under 35 U.S.C. 154(b) by 73 days.

(21) Appl. No.: 18/031,304

(22) PCT Filed: Aug. 19, 2021

(86) PCT No.: PCT/EP2021/073044
§ 371 (c)(1),
(2) Date: Apr. 11, 2023

(87) PCT Pub. No.: WO2022/078656
PCT Pub. Date: Apr. 21, 2022

(65) Prior Publication Data
US 2024/0054786 A1 Feb. 15, 2024

(30) Foreign Application Priority Data

Oct. 13, 2020 (GB) ........................... 2016206
Jun. 16, 2021 (GB) ........................... 2108599

(51) Int. Cl.
*H04N 7/15* (2006.01)
*G06T 7/11* (2017.01)
(Continued)

(52) U.S. Cl.
CPC ............... *H04N 7/15* (2013.01); *G06T 7/11* (2017.01); *G06V 20/41* (2022.01); *G06V 20/49* (2022.01);
(Continued)

(58) Field of Classification Search
None
See application file for complete search history.

(56) References Cited

U.S. PATENT DOCUMENTS 8,350,891 B2 * 1/2013 Khot ................. H04N 7/15
348/14.08
9,288,437 B2 * 3/2016 Goto ................. H04N 7/15
(Continued)

FOREIGN PATENT DOCUMENTS

| JP | 2020-048149 A | 3/2020 |
| JP | 2020-053741 A | 4/2020 |
| WO | WO 2018/061173 A | 4/2018 |

OTHER PUBLICATIONS

International Search Report and Written Opinion for International Application No. PCT/EP2021/073044 mailed Nov. 29, 2021.
(Continued)

*Primary Examiner* — Quoc D Tran
(74) *Attorney, Agent, or Firm* — Wolf, Greenfield & Sacks, P.C.

(57) ABSTRACT

A method for manipulating an initial video stream captured by a camera in a video conferencing endpoint into multiple views corresponding to regions of interest. The method comprises detecting objects of one or more predefined types in a frame of the initial video stream; selecting a plurality of crop regions (2200a, 2200b, 2200c) from the frame of the initial video stream, and transmitting the plurality of crop regions. Each crop region includes at least one bounding box and each bounding box includes a detected object of a predefined type.

15 Claims, 13 Drawing Sheets

(51) Int. Cl.
*G06V 20/40* (2022.01)
*H04N 5/265* (2006.01)
*H04N 7/14* (2006.01)

(52) U.S. Cl.
CPC ............ *H04N 5/265* (2013.01); *H04N 7/147* (2013.01); *G06T 2207/20132* (2013.01); *G06T 2207/20212* (2013.01)

(56) References Cited

U.S. PATENT DOCUMENTS

| | | | | |
|---|---|---|---|---|
| 10,999,531 | B1* | 5/2021 | Bryan | .................... G06V 40/10 |
| 2013/0083153 | A1* | 4/2013 | Lindbergh | ............... H04N 7/15 |
| | | | | 348/E7.083 |
| 2016/0359941 | A1* | 12/2016 | Kvaal | .................... H04N 7/152 |
| 2018/0063482 | A1* | 3/2018 | Goesnar | ................. H04N 23/58 |
| 2019/0065895 | A1 | 2/2019 | Wang et al. | |
| 2019/0213420 | A1* | 7/2019 | Karyodisa | .............. G06V 20/41 |
| 2019/0215464 | A1 | 7/2019 | Kumar et al. | |
| 2020/0099889 | A1 | 3/2020 | Sugihara | |
| 2020/0099890 | A1* | 3/2020 | Tanaka | ................... H04N 7/147 |

OTHER PUBLICATIONS

Adouani et al., Comparison of Haar-like, HOG and LBP approaches for face detection in video sequences. 2019 16th International Multi-Conference on Systems, Signals & Devices (SSD) Mar. 21, 2019:266-71.

Dang et al., Review and comparison of face detection algorithms. 2017 7th International Conference on Cloud Computing, Data Science & Engineering-Confluence Jan. 12, 2017:629-33.

Japanese Office Action dated Aug. 26, 2025 in connection with Japanese Application No. 2023-521714.

* cited by examiner

VIDEO STREAM MANIPULATION

CROSS-REFERENCE TO RELATED APPLICATIONS

This Application is a National Stage filing under 35 U.S.C. § 371 of International Application Serial No. PCT/EP2021/073044, filed Aug. 19, 2021, which claims the benefit of priority to GB application number 2108599.8, filed Jun. 16, 2021, and GB application number 2016206.1, filed Oct. 13, 2020, each of which is herein incorporated by reference in its entirety.

FIELD OF THE INVENTION

The present invention relates to methods and systems for video stream manipulation and particularly, although not exclusively, to methods and systems for video conference video stream manipulation based on regions of interest.

BACKGROUND

In recent years, video conferencing and video calls have gained great popularity, allowing users in different locations to have face-to-face discussions without having to travel to a same single location. Business meetings, remote lessons with students, and informal video calls among friends and family are common uses of video conferencing technology. Video conferencing can be conducted using smartphones or tablets, via desktop computers or via dedicated video conferencing devices.

Video conferencing systems enable both video and audio to be transmitted, over a digital network, between two or more participants located at different locations. Video cameras or web cams located at each of the different locations can provide the video input, and microphones provided at each of the different locations can provide the audio input. A screen, display, monitor, television, or projector at each of the different locations can provide the video output, and speakers at each of the different locations can provide the audio output. Hardware or software-based encoder-decoder technology compresses analog video and audio data into digital packets for data transfer over the digital network, and decompresses the data for output at the different locations.

Often, a video conference may include multiple, for example 4, 8, 15, 20 etc., users, at different locations (e.g. each person at a different location). Here, the video and audio stream captured at each location may be transmitted to each of the different locations, so that each user can see and hear each of the other users. For example, each user's screen may display video streams from each of the locations, sometimes including the video stream from their own location.

Sometimes, only a single user may be located at each location, so that each video stream includes only a single user. In these situations, each user may position the camera at their location so they are centrally situated in the camera's field of view.

Alternatively, in other situations, multiple people may be located at one of the locations. For example, in a business meeting held by a video conference, 3 people may be located at a first location, 1 person may be located at a second location, and 1 person may be located at a third location.

At locations where there are multiple people, a single camera provides only a single view of the location, and this video stream view may be displayed on the screens at each of the locations at a similar size as the other video streams views (e.g. where there is only a single person at the other locations). In these situations, the multiple people at a single location may look much smaller in the video stream than anyone on their own at their location.

In an attempt to address this problem, it is known to provide multiple video cameras at a location with multiple people, in order to capture multiple video stream views of that location and to cover a larger view than possible by a single camera. In some situations, the multiple video streams may each include a single person. However, this is costly, and leads to a complex system with complex installation.

Another approach uses speaker tracking (e.g. audio tracking), whereby the sound from a speaking participant is used as a rule for focusing on the speaking participant as the region of interest in the camera's field of view. However, the drawback of this solution is that it removes areas from the full picture that could be regions of interest for reasons other than sound.

The present invention has been devised in light of the above considerations.

SUMMARY OF THE INVENTION

According to a first aspect of the invention, there is provided a method for manipulating an initial video stream captured by a camera in a video conferencing endpoint into multiple views corresponding to regions of interest, the method comprising:
  detecting objects of one or more predefined types in a frame of the initial video stream;
  selecting a plurality of crop regions from the frame of the initial video stream, each crop region including at least one bounding box, each bounding box including a detected object of a predefined type; and
  transmitting the plurality of crop regions.

In this way, any regions of the frame of the initial video stream not including an object of a predefined type (e.g. not including a person) can be reduced and/or removed, and any regions including an object of a predefined type (e.g. including a person) can be emphasised. Accordingly, similar views of each person can be provided (e.g. each person can be provided as a similar size) regardless of the number of people in each location and their distance to the camera.

Optional features are set out below.

The plurality of crop regions may be transmitted as, or in, one or more frames of one or more final video streams. The one or more frames of the one or more final video streams may be for rendering and display at one or more video conferencing endpoints.

As used herein, the term crop region may be understood to be a portion of the frame, wherein the plurality of crop regions from the frame may or may not overlap each other.

The one or more predefined types of object may include a person, or a part/portion of a person. For example, the one or more predefined types of object may include a person's face, a person's head, and/or a person's head and shoulders, for example. The one or more predefined types of object may additionally/alternatively include a fixed portion of a person's upper body from the top of the head as a ratio of the person's face size, for example.

As each crop region includes one or more bounding boxes, each crop region may therefore include one or more people. Each crop region may include the same number of bounding boxes (and therefore people) or different numbers of bounding boxes (and therefore people). For example, one crop region could include one bounding box (and therefore one person), whereas another crop region could include a plurality, e.g. 2, 3, 4 or more, bounding boxes (and therefore 2, 3, 4, or more people).

The step of detecting objects of one or more predefined types in the frame may comprise:
classifying the objects in the frame; and
locating the objects of the one or more predefined types in the frame.

In particular, the step of classifying the objects in the frame may comprise predicting the class of objects in the frame in order to identify/recognise objects of the one or more predefined types in the frame.

The method may further comprise the step of setting a bounding box around the extent of each of the detected objects of the one or more predefined types.

Accordingly, the/each bounding box set around the extent of each of the detected objects of the one or more predefined types in the frame may contain information about the classification (e.g. that the bounding box contains an object of a predefined type) and/or information about the location of the object of a predefined type in the frame. The bounding boxes may comprise labels containing the classification information and/or location information.

The extent of the detected object of a predefined type may be understood as encompassing all, or a majority, of the object.

The/each bounding box may be an imaginary structure superimposed over the frame of the initial video stream, wherein the/each bounding box includes a single detected object of a predefined type. Preferably, the/each bounding box is rectangular.

The location information of the/each bounding box may comprise one or more coordinates. For example, the location information may comprise coordinates (e.g. horizontal and vertical coordinates) of the four corners of the rectangular bounding box. Alternatively, the location information may comprise coordinates (e.g. horizontal and vertical coordinates) of a known point on the rectangular bounding box (e.g. a centre, or a lower left corner, for example), and the dimensions (e.g. width and height) of the rectangular bounding box.

The step of detecting the objects of one or more predefined types in the frame may be performed using a machine learning algorithm, for example using a trained neural network, such as a Region-Based Convolutional Neural Network (R-CNN). The step of detecting the objects of the one or more predefined types in the frame may be performed using Haar Feature-based Cascade Classifiers, or a Histogram of Oriented Gradients (HOG).

The method may further comprise the step of enlarging the plurality of crop regions. The step of enlarging the crop regions may be performed before or after the step of transmitting the crop regions.

Optionally, the/each crop region may be enlarged by scaling the/each crop region to a similar size as the frame of the initial video stream. In this way, the/each object of a predefined type in the/each crop region can be viewed (when rendered and displayed) as if captured using separate cameras, rather than a single camera capturing multiple objects in its field of view.

The method may comprise transmitting only the crop regions. In this way, any regions of the frame of the initial video stream not including an object of a predefined type (e.g. not including a person) are removed from a frame of a final video stream. Alternatively, the method may comprise transmitting the crop regions in addition to the frame of the initial video stream and the crop regions may be transmitted simultaneously with the frame of the initial video stream. In this way, the frame of the initial video stream captured by the camera may still be viewed, but the objects of a predefined type (e.g. the people) are emphasised in the crop regions which are also transmitted.

The method may further comprise the step of transmitting an alert indicating which crop region of the plurality of crop regions includes a person who is currently speaking. In particular, the method may comprise detecting, based on an audio input from a microphone in the same video conferencing endpoint as the camera, which person in the camera's field of view is speaking, and transmitting the alert based on the detection.

The microphone in the video conferencing endpoint may be a microphone array. Accordingly, the step of detecting which person in the camera's field of view is speaking may be based on information received from the microphone array about the direction of sound detected by the microphone array. This step may also be based on information about the camera's field of view, and information about the selection of the plurality of crop regions from the frame of the initial video stream. Accordingly, the information about the direction of sound may be mapped onto a crop region of the plurality of crop regions. The alert may be transmitted with the plurality of crop regions to indicate to the user which crop region of the plurality of crop regions includes a person who is currently speaking. The alert may cause the crop region including the speaking person to be highlighted or further emphasised when the crop regions are rendered and displayed at one or more video conferencing endpoints.

In some examples, each crop region may be transmitted as a separate frame of a separate final video stream. Accordingly, multiple final video streams (in particular a single frame of each of a plurality of final video streams), each including a single crop region, are transmitted.

As mentioned above, each crop region includes one or more bounding boxes (and therefore one or more people). Thus, when a crop region includes one person, the corresponding final video stream includes one person. When a crop region includes multiple (e.g. 2, 3, 4, etc.) people, that corresponding final video stream includes multiple people.

In other examples, the crop regions may be compiled into a composite view and the composite view may be transmitted as a frame of a final video stream. The composite view may include each/all of the crop regions. Accordingly, only one final video stream (in particular a single frame of the single final video stream) is transmitted, the single frame including each of the crop regions (wherein each of the crop regions may include one or more people).

In alternative examples, some (but not all) of the crop regions may be compiled into a composite view and this composite view may be transmitted as a frame of a final video stream. In these examples, the composite view may include some but not all of the crop regions. The remaining crop regions may be compiled into another compositive view and this other compositive view may be transmitted as another frame of a final video stream. Alternatively, the remaining crop regions may be transmitted individually as separate frames of a separate final video stream. Each of the frames of the plurality of final video streams (wherein each frame may include a compositive view of crop regions, or a single crop region) may be transmitted simultaneously. Composition (i.e. compiling multiple crop regions into a composite view) in a plurality or all final video streams has advantages when the maximum number of video streams is limited. For example, when there is a limited maximum number of final video streams, and there are more people in the initial frame than the maximum number of final video streams, the people may be spaced far apart from each other when each crop region is transmitted in a separate final video stream, Composition helps to remove wasted space between the people so that each person has more pixel area in the final view stream.

Compiling multiple crop regions into a composite view also has the advantage that the number of separate final video streams is less likely to change with movement, or even loss or addition of the objects of the one or more predefined types in the initial frame (e.g. people moving, or walking into or out of the initial frame). For example, if the number of bounding boxes or crop regions changes, the transition between frames in the final video stream may be animated.

In some examples, a composite view of all of the plurality of crop regions may be transmitted as a frame together with frames containing one or more of the plurality of crop regions. The recipient may therefore receive both a final video stream including a composite view formed of all of the plurality of crop regions (as an overview stream), and a plurality of final video streams each containing one or more of the crop regions.

The number of final video streams transmitted may be determined based on a number of objects of the one or more predefined types (e.g. people) identified in the initial video stream. For example, when the number of objects of the one or more predefined types is relatively small (e.g. three or less, or four or less, or five or less) a single final video stream may be transmitted containing a composite view of all of the crop regions. This provides improved enlargement benefits whilst reducing network usage and/or screen area at the receiver end.

The number of final video streams transmitted may be determined so that a similar or same number of bounding boxes, and therefore predefined objects (e.g. people), are within each final video stream. For example, when four objects of the one or more predefined types are identified, two video streams may be transmitted each containing a composite frame containing two crop regions (each crop region containing one of the four objects).

Each final video stream (which may include a single crop region, a plurality but not all of the crop regions, or all of the crop regions) may be advertised on a network as a virtual camera to which a subscription may be made. This can allow a receiver to select which final video stream to subscribe to and view. This allows a higher-level application layer to process and transmit the final video streams in a similar manner to a physical camera.

When each crop region is transmitted as a separate frame of a separate final video stream, the number of crop regions from the frame of the initial video stream may be based on a predefined maximum number of final video streams, the number of bounding boxes, and a predefined preferred aspect ratio of each crop region.

Optionally, the predefined maximum number of final video streams may be determined based on a network bandwidth limitation, network capacity, or limitations of the overall computational system (e.g. limitations of one or more video conferencing endpoints configured to receive the transmitted crop regions, or limitations of a data processing device configured to perform the method of the first aspect). The method may comprise receiving information indicating the predefined maximum number of final video streams from a remote server, or a network service provider. The method may comprise negotiating the maximum number of final video streams with a network service provider.

The method may comprise repeating the step of selecting a plurality of crop regions from the frame of the initial video stream, if the predefined maximum number of final video streams changes (e.g. during negotiations with the network server provider). The number of crop regions selected from the frame of the initial video stream may also be transmitted to the network service provider.

The number of crop regions selected from the frame of the initial video stream may be less than, or equal to, the predefined maximum number of final video streams.

When each crop region is compiled into a composite view and the composite view is transmitted as a frame of a single final video stream, the number of crop regions selected from the frame of the initial video stream may be based on the number of bounding boxes, a predefined preferred aspect ratio of each crop region, and one or more predefined requirements of the composite view of the crop regions.

For example, the one or more predefined requirements of the composite view of the crop regions may include a predefined total size, a predefined shape, a predefined aspect ratio and/or a predefined maximum number of rectangles in a layout forming the composite view, wherein a crop region is to be provided in each rectangle of the layout when the crop regions are compiled into a composite view.

The layout forming the composite view may be a grid, such that the composite view comprises a grid of rectangles, each rectangle containing a crop region, for example.

The number of crop regions selected from the frame of the initial video stream may be less than, or equal to, the predefined maximum number of rectangles in the layout forming the composite view. By limiting the number of rectangles on the layout of the composite view, it can be ensured that each rectangle, and therefore each crop region, is not too small.

Selecting a plurality of crop regions from the frame may be performed by reducing areas of the crop regions not overlapping any bounding boxes.

Selecting a plurality of crop regions from the frame may alternatively/additionally comprise reducing an overlap between the crop regions.

Optionally, selecting a plurality of crop regions from the frame comprises minimizing areas of the crop regions not overlapping any bounding boxes and/or minimizing an overlap between the crop regions.

Each crop region may be rectangular.

Each crop region may be defined by (e.g. four) parameters. In an example, each crop region may be defined by the coordinates (e.g. horizontal and vertical coordinates) of its four corners. In other examples, each crop region may be defined by coordinates (e.g. horizontal and vertical coordinates) of a known point on (e.g. a centre of, or a lower left corner of, for example) the crop region, and the dimensions (e.g. width and height) of the crop region.

An exhaustive search for the optimized parameters of each crop region for each frame of the initial video stream may not be ideal due to computer time and space restraints. Therefore, the step of selecting a plurality of crop regions from the frame of the initial video stream may comprise parametrising each crop region by minimizing a cost function (also known as a loss function). In other words, the parameters (e.g. the size, shape and position) of each crop region may be determined by minimizing the cost function. The cost function may comprise a weighted sum of (i) a term correlated to areas of the crop regions not overlapping any bounding boxes; and (ii) a term correlated to the overlap between the crop regions. The cost function may be a weighted sum of (i) areas of the crop regions not overlapping any bounding boxes; and (ii) the overlap between the crop regions, or the cost function may be a weighted sum of the square of these terms, for example.

Minimizing a cost function is equivalent to maximizing an opposite function called fitness, and therefore, the parameters of each crop region may be determined by maximizing a fitness function comprising a weighted sum of (i) a term correlated to areas of the crop regions not overlapping any bounding boxes; and (ii) a term correlated to the overlap between the crop regions. The coefficients of a weighted sum in a fitness function are negative while the coefficients of a weighted sum in a cost function are positive. Any term in a cost function which is correlated to the two terms is equivalent.

The step of selecting a plurality of crop regions from the frame of the initial video stream may comprise determining possible candidate sets of crop regions. The cost function may then be minimized with respect to the determined possible candidate sets of crop regions. This helps to reduce computational time and space by minimizing the cost function on only the determined possible candidate sets of crop regions, rather than each and every possible set of crop regions.

Determining possible candidate sets of crop regions may comprise one or more of:
 identifying all possible candidate sets of crop regions that satisfy the predefined preferred aspect ratio of each crop region;
 limiting the possible candidate sets of crop regions to possible candidate sets where each crop region in the candidate set includes less than, or equal to, a predefined number of bounding boxes (e.g. 4 or less, more preferably 3 or less, more preferably 2 or less, more preferably 1, bounding boxes);
 limiting the possible candidate sets of crop regions to possible candidate sets where all bounding boxes are included in the crop regions; and
 limiting the possible candidate sets of crop regions such that the number of crop regions in each possible candidate set of crop regions is less than, or equal to, the predefined maximum number of final video streams, or less than, or equal to, the predefined maximum number of rectangles in the layout forming the composite view.

The cost function may then be minimized with respect to the limited possible candidate sets of crop regions.

The step of determining possible candidate sets may further comprise limiting the possible candidate sets of crop regions such that the number of crop regions in each possible candidate set is less than a first predefined threshold and/or more than a second predefined threshold. In this way, potential candidate sets of crop regions are not too big (e.g. do not include too many crop regions) and/or not too small (e.g. do not include too few crop regions).

The step of determining possible candidate sets may further comprise limiting the possible candidate sets of crop regions such that the crop regions in each possible candidate set include one or more bounding boxes set around an object of a predefined type from a predefined subset of predefined types. For example, the predefined subset of predefined types may include a person's head, and a person's head and shoulders. Therefore, the possible candidate sets of crop regions are limited to only including crop regions including bounding boxes around a person's head or a person's head and shoulders. The limited possible candidate sets would then not include bounding boxes showing only a person's forehead, or a person's whole body, for example. This further limits the number of possible candidate sets of crop regions for which the cost function is minimized, thus further reducing computational load.

Alternatively/additionally, the method may further comprise the step of optimizing the cost function in a cost optimization process. The cost function may be optimized with respect to one or more constraints relating to one or more of the predefined maximum number of final video streams, the predefined maximum number of rectangles in the layout forming the composite view, the number of bounding boxes, and the predefined preferred aspect ratio of each crop region. This is known as constrained optimization. The step of minimizing the cost function may then be performed using one or more mathematical solvers such as Linear Programming, Interior Point Method, and Generalized Reduced Gradient. Alternatively, other mathematical tools may be used to minimize the cost function, such as a Genetic Algorithm. The cost function may comprise first and second order derivatives (because the geometric area of the frame of the initial video stream comprises a second order of coordinates). The constraints may be expressed as mathematical linear constraint forms. A linear constraint may be considered a mathematical expression where linear terms (i.e., a coefficient multiplied by a decision variable) are added or subtracted and the resulting expression is forced to be greater-than-or-equal, less-than-or-equal, or exactly equal to a right-hand side value. These expressions can help solvers to converge to an optimal solution faster.

The constraints may additionally/alternatively relate to the objects of the predefined types. For example, the constraints may relate to the ratio of a fixed portion of a person's upper body from the top of the head, to the person's face size. These constraints may comprise a maximum and/or a minimum ratio, for example.

When a plurality of, or each, crop region is compiled into a composite view and the composite view is transmitted as a single frame of a single final video stream, the relative spatial order, or relative positions, of the objects of the one or more predefined types in the frame of the initial video stream may be maintained in the layout forming the frame of the final video stream. In this way, a person sitting on the left hand side of another person is still viewed as sitting on the left hand side of the other person in the layout forming the frame of the final video stream. This can be achieved, for example, by the inclusion of metadata in the or each final video stream. The metadata may also identify whether the active speaker is located within a given composite view or final video stream, and may further identify how many objects of the one or more predefined types are within any given frame. When the metadata identifies the active speaker, the crop region containing the active speaker may be modified so that the active speaker is given prominence over other objects of the one or more predefined types e.g. by enlargement or highlighting.

The method may include a step of blurring or replacing a background of each crop region. A background may be any portion of the crop region not including the or each object of the one or more predefined types. For example, a mask may be applied which blurs or replaces all parts of the crop region not corresponding to the or each object of the one or more predefined types. The mask may be retrieved either from a depth sensor, or from a pre-trained machine learning model.

Optionally, the arrangement of the layout (e.g. size/shape/aspect ratio of the rectangles in the layout, order of crop regions in the layout, etc.) may be determined by an optimization process. The optimization process may be based on an aspect ratio of each crop region selected from the frame of the initial video stream, and/or on the predefined preferred aspect ratio of each crop region. As an example, the optimization process may determine that a layout (e.g. grid) forming the composite view comprising three equal sized crop regions stacked vertically, is better than a layout having one larger square crop region on the left and two smaller, vertically stacked rectangular crop regions on the right. This determination may be based on the aspect ratio of each crop region selected from the frame of the initial video stream.

An exhaustive search for the optimized aspect ratios of the rectangles may not be ideal due to computer time and space restraints. Therefore, the step of determining the arrangement of the layout may comprise determining possible candidates for the arrangement of the layout, such as the arrangement of the rectangles in the layout (e.g. possible candidates for the aspect ratio of each of the rectangles in the layout), before determining (e.g. selecting) the arrangement of the layout from the limited possible candidates for the arrangement of the layout.

The possible candidates for the aspect ratio of each of the rectangles in the layout may be limited to a set of predefined aspect ratios, such as 16:9, 4:3, 1:1, for example.

The step of enlarging the crop regions may comprise scaling each crop region by a scaling factor to fit a respective rectangle in the layout forming the composite view in the frame of the final video stream.

Optionally, when the method comprises the cost optimization process such that the cost function is minimized using constrained optimization, the constraints may relate to one or more of the optimized aspect ratio of each rectangle in the layout, a predetermined point (e.g. a top left corner of the layout), and the scaling factor. Accordingly, the crop regions may be sized and shaped to fully cover the layout (e.g. grid) forming the composite view in the frame of the final video stream. Accordingly, there may be boundary conditions for (linear) combinations of the (linear) constraints. The step of minimizing the cost function may then be performed using one or more mathematical solvers such as Linear Programming, Interior Point Method, and Generalized Reduced Gradient. Alternatively, other mathematical tools may be used to minimize the cost functions, such as a Genetic Algorithm.

The method may comprise detecting objects of one or more predefined types in a subsequent frame of the initial video stream. The method may comprise setting a bounding box around the extent of each of the detected objects in the subsequent frame.

The method may comprise selecting crop regions from the subsequent frame of the initial video stream. This crop region selection of the subsequent frame may be based on the crop regions selected from the (initial) frame, and (tracked) movement of the bounding boxes (and therefore the detected objects of the one or more predefined types) between the (initial) frame and the subsequent frame. This reduces the computational load compared to a method in which crop regions in each subsequent frame are selected in the same way as the initial frame. Furthermore, a consistent view of each crop region may be provided even if the detected objects move during the initial video stream.

Preferably, the same number of crop regions may be selected in the subsequent frame as the (initial) frame. In this way, a consistent view of the crop regions may be provided.

Preferably, each crop region from the subsequent frame may include the same detected object(s) as the corresponding crop region from the (initial) frame. In this way, a consistent view of the object(s) of the predefined types may be obtained.

In particular, the method may comprise tracking a movement of the bounding boxes (and therefore the detected objects) from the (initial) frame to the subsequent frame. The method may comprise tracking location information of the bounding boxes (and therefore the detected objects) in the frame and the subsequent frame (e.g. based on location information of the bounding boxes set around the detected objects in the frame and the subsequent frame), and selecting crop regions from the subsequent frame based on the location information of the bounding boxes in the frame and the subsequent frame.

In other words, for the subsequent frame, each bounding box (and therefore each object of the one or more predefined types) may be identified as corresponding with a bounding box in the (initial) frame based on the location information of the bounding boxes (and therefore the objects of the one or more predefined types) in the initial frame and the subsequent frame. In particular, each bounding box in the subsequent frame may be identified as corresponding with a bounding box in the (initial) frame based on the difference in the location information of the bounding boxes between the frame and the subsequent frame, whereby bounding boxes which have shifted the smallest distance between the frame and the subsequent frame are identified as corresponding pairs of bounding boxes. The crop regions of the subsequent frame may then be selected based on the corresponding pairs of bounding boxes so that each crop region in the subsequent frame includes the same bounding boxes (and therefore the same object(s)) as the corresponding crop region in the (initial) frame.

Alternatively/additionally, tracking the movement of the bounding boxes (and therefore objects of the one or more predefined types) from the frame to the subsequent frame of the initial video stream may be performed using a feature mapping algorithm, or by employing an optical flow estimation algorithm to track movement of pixels in each bounding box.

The method may further comprise transmitting the crop regions from the subsequent frame, similarly to as discussed above with respect to the (initial) frame.

The method may further comprise enlarging the crop regions from the subsequent frame.

The method may further comprise:
  determining an amount of overlap between a pair of crop regions from the subsequent frame; and
  merging the pair of crop regions from the subsequent frame, if the amount of overlap exceeds a predefined overlap threshold.

In this way, the possibility of duplication of the objects of a predefined type in the crop regions from the subsequent frame is reduced.

The method may further comprise determining a size of one or more crop regions from the subsequent frame, and splitting a crop region from the subsequent frame into two or more resulting crop regions if the size exceeds a predefined size threshold.

In this way, where a crop region from the subsequent frame includes a plurality of bounding boxes (and therefore a plurality of objects of a predefined type), and where the plurality of bounding boxes have moved further apart from one another in the subsequent frame compared to in the (initial) frame, the crop region from the subsequent frame can be split into two or more resulting crop regions to reduce/remove any regions of the subsequent frame of the initial video stream not including an object of one or more predefined types (e.g. not including a person). Accordingly, emphasis of the objects of the one or more predefined types from the subsequent frame can be improved, even if the objects of the one or more predefined types have moved relative to their position in the (initial) frame.

A crop region from the subsequent frame may be split based on the number of bounding boxes included therein. For example, if there are 3 bounding boxes (e.g. three people) in a particular crop region from the subsequent frame, and the 3 bounding boxes in the subsequent frame have moved further apart from one another compared to in the (initial) frame such that the crop region from the subsequent frame has exceeded the size threshold, the crop region may be split into 3 resulting crop regions, each including a single bounding box (and therefore a single object of a predefined type/person).

Optionally, the method may further comprise:
determining whether the crop regions from the subsequent frame meet a predefined criterion; and
if the crop regions from the subsequent frame do not meet the predefined criterion, re-selecting crop regions from the subsequent frame of the initial video stream, each re-selected crop region including at least one bounding box.

In this way, if too much movement of the bounding boxes (and therefore the objects of the one or more predefined types) has occurred between the (initial) frame and the subsequent frame, the crop regions from the subsequent frame are re-selected using the same method as for selecting the crop regions from the (initial) frame.

The step of determining whether the crop regions from the subsequent frame meet the predefined criterion may be performed according to a metric, wherein the metric may be the return value of the cost function described above. In particular, the predefined criterion may be that the metric is less than a predefined threshold.

Crop regions from further subsequent frames (e.g. a third, fourth, fifth . . . Nth frame) of the initial video stream may be selected in a similar way to the subsequent frame. For example, the method may comprise detecting objects of one or more predefined types in an Nth frame of the initial video stream, setting a bounding box around the extent of each of the detected objects in the Nth frame of the initial video stream; and selecting crop regions from the Nth frame of the initial video stream, based on the crop regions from the (N−1)th frame, and movement of the bounding boxes between the (N−1)th frame and the Nth frame.

The crop regions from the further subsequent frames (e.g. the Nth frame) of the initial video stream may be transmitted similarly to as discussed above for the (initial) frame and subsequent frame such that one or more final video streams are transmitted (for rendering and display by/at one or more video conferencing endpoints).

The initial video stream may be received from the video conferencing endpoint having the camera, via a digital network, which may be wired or wireless.

The video conferencing endpoint may be a computing device, a mobile device, or some other data processing device. As used herein, the term video conferencing may be understood to encompass video calls.

The method may comprise transmitting the crop regions from the (initial) frame (and any subsequent frame) to one or more video conferencing endpoints (e.g. computing devices) for rendering at the one or more video conference endpoints (which may also include the video conferencing endpoint from which the initial video stream was received). Accordingly, one or more users can view the crop regions at their respective video conferencing endpoint (e.g. at a display or screen of their computing device). The crop regions may be transmitted via a digital network, which may be wired or wireless.

The method of the first aspect may be performed at a data processing device, which may be in or connected to a video conferencing endpoint, and in some examples, the video conferencing endpoint having the camera. By manipulating the initial video stream at the video conferencing end point having the camera, the crop regions may be of higher quality/resolution, because the initial video stream may not have been previously compressed and/or encoded to be transmitted. As such, the initial video stream may be a raw data stream from the camera (e.g. an unencoded and/or uncompressed raw video stream). Alternatively, the method of the first aspect may be performed at a server. The server may be at a remote location from video conferencing endpoints (e.g. a video conferencing endpoint which sends the initial video stream, and one or more video conferencing endpoints that receive the crop regions) and the camera which captures the initial video stream.

A second aspect of the invention provides a data processing device comprising means configured to carry out the method of the first aspect.

As such, according to a second aspect of the invention, there is provided a data processing device for manipulating an initial video stream captured by a camera in a video conferencing endpoint into multiple views corresponding to regions of interest, the data processing device comprising:
a receiver configured to receive a frame of the initial video stream captured by the camera;
an object detection unit configured to detect objects of one or more predefined types in the frame of the initial video stream;
a cropping unit configured to select a plurality of crop regions from the frame of the initial video stream, each crop region including at least one bounding box, each bounding box including a detected object of a predefined type; and
a transmitter configured to transmit the plurality of crop regions.

Optionally, the data processing device may comprise a bounding box setting unit configured to set a bounding box around the extent of each of the objects of the one or more predefined types detected by the object detection unit.

The data processing device may be configured to receive the initial video stream, wirelessly or via a wired connection, from the camera or via the video conferencing endpoint having the camera, and transmit, wirelessly or via a wired connection, the crop regions to one or more video conferencing endpoints (e.g. computing devices) for rendering and display at/by the one or more video conferencing endpoints.

The data processing device may be in or connected to a video conferencing endpoint. In particular, the data processing device may be in or connected to the same video conferencing endpoint as the camera. The data processing device may be configured to receive the initial video stream from the camera or via a computing device connected to the camera, via a wired connection. Alternatively, the data processing device may be a remote server.

A third aspect of the invention provides a video conferencing system for manipulating an initial video stream into multiple views corresponding to regions of interest; the system comprising:
the data processing device of the second aspect;
a camera configured to capture an initial video stream and transmit the initial video stream to the data processing device; and one or more video conferencing endpoints; wherein the data processing device is configured to receive the initial video stream from the camera, and transmit the crop regions to the one or more video conferencing endpoints for display.

Therefore, according to a third aspect of the invention, there is provided a video conferencing system for manipulating an initial video stream into multiple views corresponding to regions of interest, the system comprising:
- a camera configured to capture an initial video stream;
- one or more video conferencing endpoints; and
- a data processing device, the data processing device comprising:
  - a receiver configured to receive a frame of the initial video stream captured by the camera;
  - an object detection unit configured to detect objects of the one or more predefined types in the frame of the initial video stream;
  - a cropping unit configured to select a plurality of crop regions from the frame of the initial video stream, each crop region including at least one bounding box, each bounding box including a detected object of a predefined type; and
  - a transmitter configured to transmit the plurality of crop regions to the one or more video conferencing endpoints.

The one or more video conferencing endpoints may be a computing device or a mobile device, for example, and may be configured to render and display the crop regions. The one or more video conferencing endpoints may be configured to display the crop regions as separate frames of separate final video streams, or as a composite view in a single frame of a final video stream.

In particular, where each crop region is transmitted from the data processing device as a separate frame of a separate final video stream, multiple final video streams may be rendered and displayed at the video conferencing endpoints, wherein each final video stream includes a single crop region from each frame of the initial video stream. Therefore, each object of a predefined type (e.g. each person) is displayed in their own separate video stream, as if they were alone at their own location, regardless of whether there are multiple people in the camera's field of view.

Alternatively, where the enlarged crop regions are compiled into a composite view, a single final video stream may be rendered and displayed at the one or more video conferencing endpoints, the single final video stream comprising a layout (e.g. a grid) including each of the crop regions from each frame of the initial video stream.

A fourth aspect of the invention provides a computer-readable storage medium comprising instructions which, when executed by a data processing device, cause the data processing device to carry out the method of the first aspect.

The invention includes the combination of the aspects and preferred features described except where such a combination is clearly impermissible or expressly avoided.

SUMMARY OF THE FIGURES

Embodiments illustrating the principles of the invention will now be discussed with reference to the accompanying figures in which:

FIG. 7b shows bounding boxes in the example first frame of the initial video stream of FIG. 7a;

FIG. 7c shows transmitted crop regions selected from the example first frame of the initial video stream of FIG. 7a;

DETAILED DESCRIPTION OF THE INVENTION

Aspects and embodiments of the present invention will now be discussed with reference to the accompanying figures. Further aspects and embodiments will be apparent to those skilled in the art.

Figure 1:
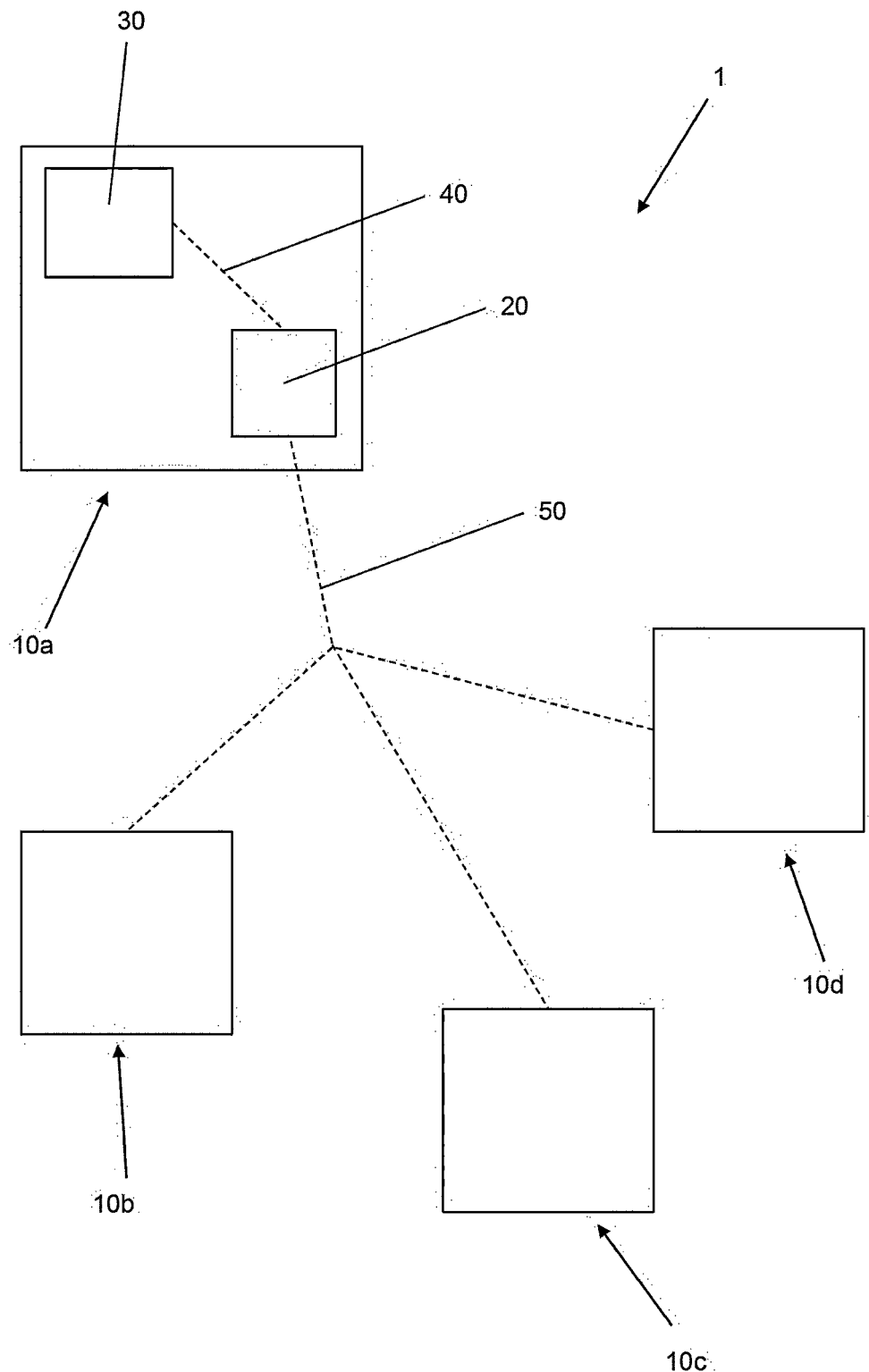
FIG. 1 shows a schematic drawing of a video conferencing system including multiple video conferencing endpoints.

FIG. 1 shows a video conferencing system 1 including a plurality of video conferencing endpoints 10a-10d, each of which may be controlled by a respective user. The video conferencing endpoints 10a-10d (and therefore the users) are located at different locations. They comprise a computing device, a mobile device, a tablet, or a dedicated video conferencing device etc. The video conferencing system 1 enables both video and audio signals to be transmitted, via digital network 50, between the video conferencing endpoints 10a-10d. Digital network 50 is preferably wireless, but may also be wired.

A video camera (such as video camera 30 in video conferencing endpoint 10a) and microphone (not shown) is positioned at each of the video conferencing endpoints 10a-10d in order to provide a video input and an audio input, respectively. A screen, display, monitor, television, and/or projector, and speakers (not shown) are positioned at each of the video conferencing endpoints 10a-10d in order to provide a video output and an audio output, respectively.

In FIG. 1, one of the video conferencing endpoints 10a comprises a data processing device 20. In some other example video conferencing systems, each video conferencing endpoint 10a-10d may comprise such a data processing device 20.

Camera 30 at video conferencing endpoint 10a is configured to capture an initial video stream (wherein the initial video stream comprises a plurality of video frames, each including one or more users (i.e. people) positioned within the camera's field of view), and transmit the initial video stream to the data processing device 20 (e.g. via connection 40, which may be wired or wireless).

Figure 2:
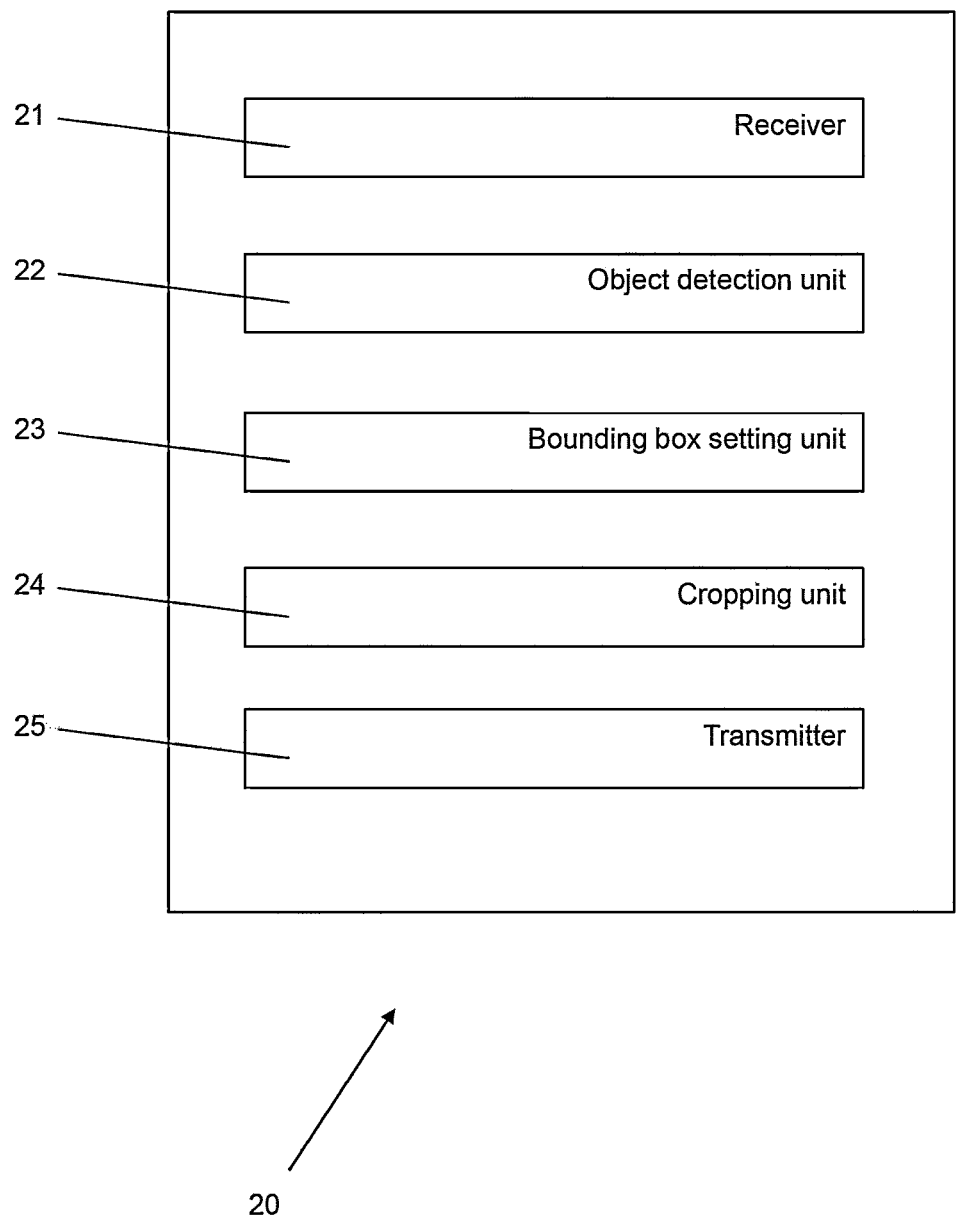
FIG. 2 shows a schematic drawing of a data processing device which may be included in a video conferencing endpoint.

FIG. 2 schematically illustrates an example data processing device 20 which may be positioned in video conferencing endpoint 10a of video conferencing system 1, shown in FIG. 1.

The data processing device 20 comprises a receiver 21 which is configured to receive (wirelessly or via a wired connection) the initial video stream from the camera 30.

The data processing device 20 also comprises an object detection unit 22, a bounding box setting unit 23, and a cropping unit 24, which together are configured to manipulate the initial video stream received by the receiver 21 into multiple views (or "crop regions") which correspond to regions of interest in the initial video stream. The regions of interest may correspond to portions of the initial video stream including people, for example.

The data processing device 20 also comprises a transmitter 25, which is configured to transmit (wirelessly, or via a wired connection) the crop regions of interest to the video conferencing endpoints 10a-10d, for rendering and display thereon.

Figure 3:
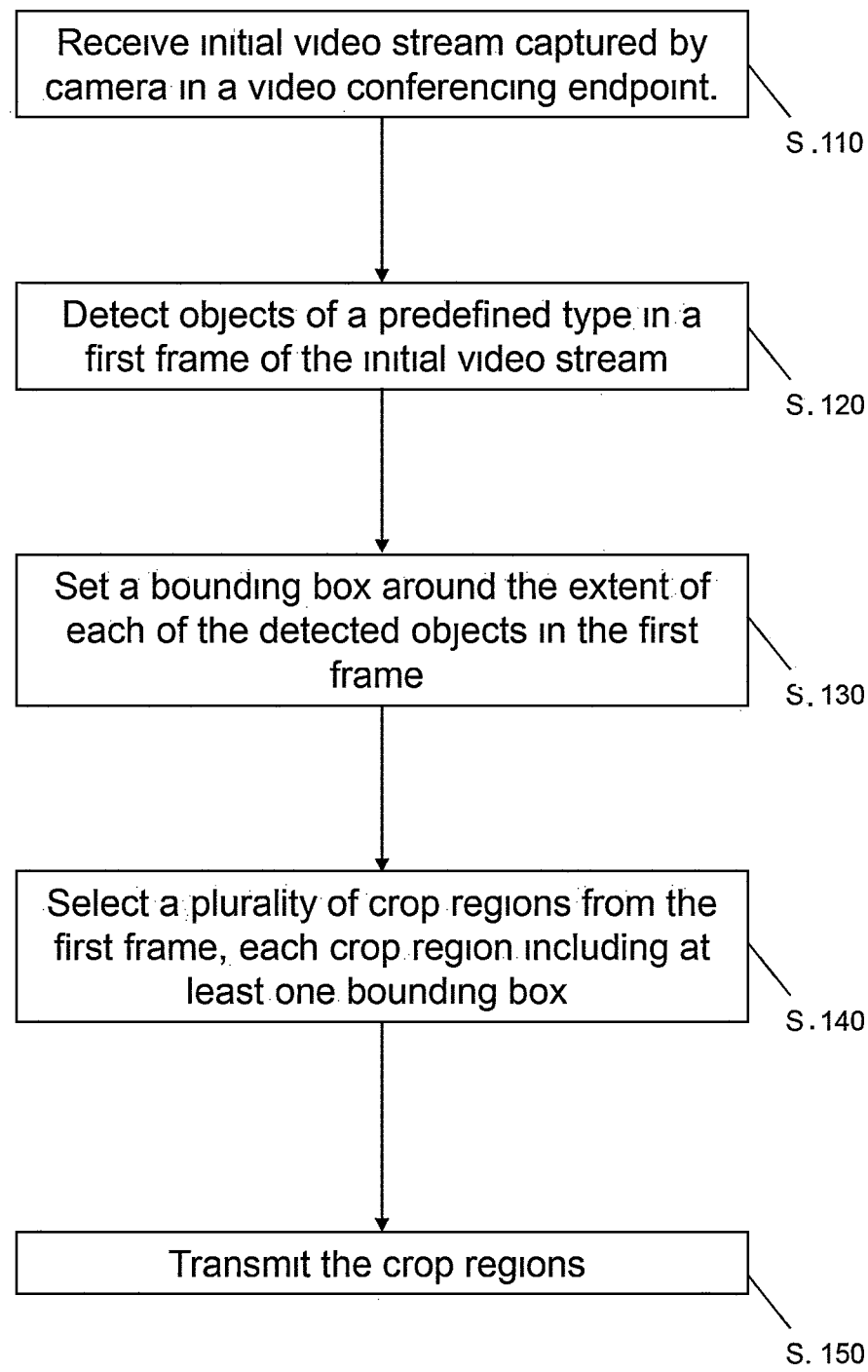
FIG. 3 shows the steps of a method performed by the data processing device of FIG. 2.

FIG. 3 shows the steps of a method 100 performed by the data processing device 20 of FIG. 2.

Firstly, at S. 110, the receiver 21 of the data processing device 20 receives the initial video stream captured by camera 30 in video conferencing endpoint 10a.

Next, at S. 120, the object detection unit 22 detects objects of one or more predefined types, (e.g. where a predefined type may be a person, for example), in a first frame of the initial video stream received by the receiver 21. In particular, the object detection unit 22 predicts the class of objects in the first frame in order to identify, recognise and classify the objects in the first frame as people. The object detection unit 22 also locates (e.g. finds the location of) the people in the first frame.

S.120 may be performed using a machine learning algorithm, for example using a trained neural network, such as a Region-Based Convolutional Neural Network (R-CNN). Alternatively/additionally, S.120 may be performed using Haar Feature-based Cascade Classifiers, or a Histogram of Oriented Gradients (HOG).

At S.130, the bounding box setting unit 23 sets a rectangular bounding box around the extent of each of the detected objects, such that each bounding box contains a single object of a predefined type. The predefined object types may be considered as a person, a person's face, a person's head, and/or a person's head and shoulders, for example. A predefined object type may be a fixed portion of a person's upper body from the top of the head as a ratio of the person's face size, for example. Therefore, in an example of S.130, a bounding box is set around the extent of each person's head and shoulders in the first frame.

The/each bounding box set around the extent of each person's head and shoulders in the first frame may comprise labels containing information about the classification (e.g. that the bounding box contains a person's head and shoulders) and information about the location of the person's head and shoulders (e.g. coordinates).

In some examples, the location information in the labels of the bounding boxes may comprise coordinates (e.g. horizontal and vertical coordinates) of the four corners of the rectangular bounding box. Alternatively, the location information may comprise coordinates (e.g. horizontal and vertical coordinates) of a known point on the rectangular bounding box (e.g. a centre, or a lower left corner, for example), and the dimensions (e.g. width and height) of the rectangular bounding box.

At S.140, the cropping unit 24 selects crop regions from the first frame. Each crop region includes at least one bounding box (and therefore at least one person, such as at least one head and shoulders of a person). In some examples, a crop region may include a plurality of bounding boxes, for example where two bounding boxes are located close to one another in the frame.

At S.150, the transmitter 25 transmits the crop regions to the video conferencing endpoints 10a-d for rendering and display thereon. The transmitter 25 may transmit only the crop regions so that any portions of the first frame not including an object of the one or more predefined types (e.g. portions not including a person's head and shoulders) are not transmitted. Accordingly, only regions of interest of the first frame are transmitted. However, in other examples, the first frame of the initial video stream may be transmitted in addition to the crop regions, so that the original first frame can still be viewed at the video conferencing endpoints, but the objects of one or more predefined types (e.g. the people) are emphasised in the crop regions.

The crop regions from the first frame of the initial video stream may be transmitted as respective first frames of separate final video streams. In other words, the transmitter 25 may transmit the crop regions separately.

Alternatively, the crop regions from the first frame of the initial video stream may be compiled into a composite view and transmitted as a single first frame of a final video stream. The composite view may include each of the crop regions, such that the transmitted 25 transmits the crop regions together in a single frame of a single final video stream.

Figure 4:
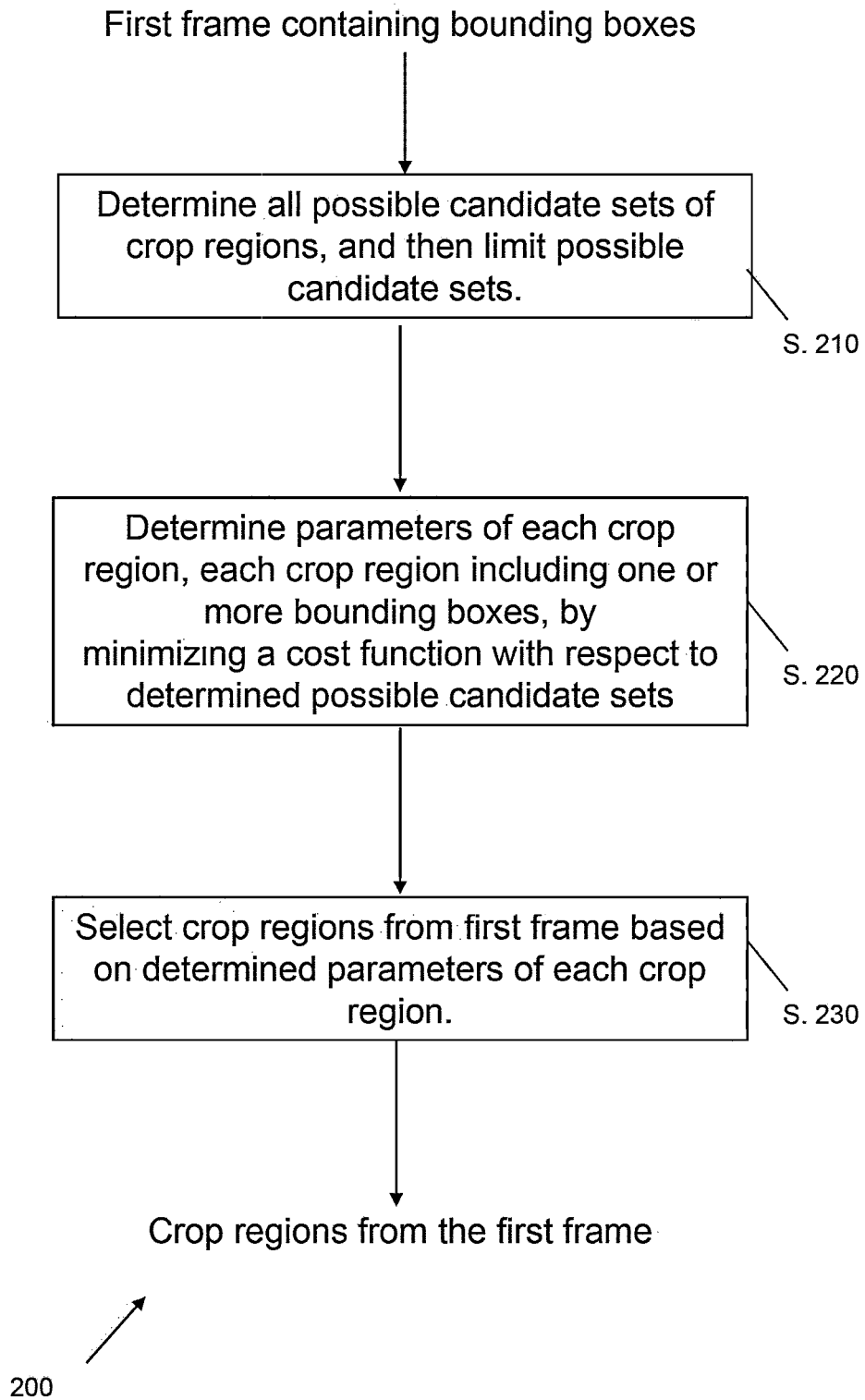
FIG. 4 shows the steps of a method for selecting crop regions from a first frame of an initial video stream captured by a camera in a video conferencing endpoint.

FIG. 4 shows the steps of a method 200 for selecting a plurality of crop regions from the first frame of the initial video stream (which are therefore sub-steps of S.140 of FIG. 3). The steps of method 200 are performed by the cropping unit 24.

At S.210, a limited number of possible candidate sets of crop regions are determined from the first frame containing the bounding boxes. This helps to reduce computational time and space requirements of the cropping unit 24, by selecting the preferred (or even optimized) crop regions from a limited number of possible candidate sets of crop regions, rather than all possible candidate sets.

Determining possible candidate sets of crop regions at S.210 includes determining (e.g. identifying) all possible candidate sets that satisfy a predefined preferred aspect ratio of each crop region, and then limiting the number of possible candidate sets. The predefined preferred aspect ratio of each crop region may be stored in the data processing device 20, or received from a remote device (e.g. a remote server) via the receiver 21.

Limiting the possible candidate sets of crop regions may include one or more of:
- Limiting the possible candidate sets of crop regions to possible candidate sets where each crop region in the candidate set includes less than, or equal to, a predefined number of bounding boxes;
- Limiting the possible candidate sets of crop regions to possible candidate sets where all bounding boxes in the first frame are included in the crop regions;
- Limiting the possible candidate sets of crop regions such that the number of crop regions in each possible candidate set is less than a first predefined threshold and/or more than a second predefined threshold; and/or
- Limiting the possible candidate sets of crop regions such that the crop regions in each possible candidate set include one or more bounding boxes set around one of a predefined set of predefined object types (e.g. such that each crop region in each possible candidate set includes a person's head or a person's head and shoulders, but not a whole person, for example).

When the crop regions are transmitted as separate first frames of separate final video streams in S.150 (i.e. such that each first frame of each final video stream includes a single crop region), limiting the possible candidate sets of crop regions may include limiting the possible candidate sets of crop regions such that the number of crop regions in each possible candidate set is less than, or equal to, a predefined maximum number of final video streams. The predefined maximum number of final video streams may be stored in the data processing device 20, or received from a remote device (e.g. a remote server). The predefined maximum number of final video streams may be determined based on a network bandwidth limitation, network capacity, or limitations of the video conferencing system 1 (e.g. limitations of one or more video conferencing endpoints 10a-10d, or limitations of the data processing device 20).

When the crop regions are compiled into a composite view and transmitted as a single first frame of a final video stream in S.150 (i.e. such that the first frame of the final video stream includes all crop regions), limiting the possible candidate sets of crop regions may include limiting the possible candidate sets of crop regions such that the crop regions in each possible candidate set meet one or more predefined requirements of the composite view.

For example, the one or more predefined requirements of the composite view may include a predefined total size, a predefined shape, a predefined aspect ratio and/or a predefined maximum number of rectangles in a layout forming the composite view, wherein a crop region is to be provided in each rectangle of the layout when the crop regions are compiled into a composite view.

Accordingly, in an example, limiting the possible candidate sets of crop regions may include limiting the possible candidate sets of crop regions such that the number of crop regions in each possible candidate set is less than, or equal to, a predefined maximum number of rectangles in the layout forming the composite view. The predefined maximum number of rectangles in the layout forming the composite view may be stored in the data processing device 20, or received from a remote device (e.g. a remote server). The predefined maximum number of rectangles in the layout forming the composite view may be determined based on a network bandwidth limitation, network capacity, or limitations of the video conferencing system 1 (e.g. limitations of one or more video conferencing endpoints 10a-10d, or limitations of the data processing device 20).

At S.220, parameters of a set of preferred crop regions are determined from the possible candidate sets. In particular, parameters of each crop region are determined by minimizing a cost function with respect to the determined possible candidate sets of crop regions. The cost function comprises a weighted sum of (i) a term correlated to areas of the crop regions not overlapping any bounding boxes; and (ii) a term correlated to the overlap between the crop regions.

Each rectangular crop region may be defined by 4 parameters. The 4 parameters of each crop region may be the horizontal and vertical coordinates of its four corners, or horizontal and vertical coordinates of a centre of the crop region, and the dimensions (e.g. width and height) of the crop region.

At S.230, the crop regions from the first frame are selected based on the determined parameters of each crop region, and are then transmitted in S.150, as shown in FIG. 2.

In another method for selecting a plurality of crop regions from the first frame of the initial video stream (which are therefore sub-steps of S.140 of FIG. 3), the cost function may be optimized in a cost optimization process with respect to one or more constraints, and may be minimized using constrained optimization. This cost function may then be minimized using one or more mathematical solvers such as Linear Programming, Interior Point Method, and Generalized Reduced Gradient. Alternatively, other mathematical tools may be used to minimize the cost function, such as a Genetic Algorithm.

The constraints may relate to one or more of:
The number of bounding boxes in each crop region (e.g. to require 2 or less bounding boxes in each crop region);
The predefined preferred aspect ratio of each crop region; and/or
The predefined object type, e.g. parameterised by a maximum and/or minimum ratio of a fixed portion of a person's upper body from the top of the head, to the person's face size.

When the crop regions are transmitted as separate first frames of separate final video streams in S.150 (i.e. such that each first frame of each final video stream includes a single crop region), the constraints may also relate to the predefined maximum number of final video streams.

When the crop regions are compiled into a composite view and transmitted as a single first frame of a final video stream in S.150 (i.e. such that the first frame of the final video stream includes all crop regions), the constraints may also relate to the predefined maximum number of rectangles in the layout forming the composite view.

An arrangement of the layout (e.g. grid) forming the composite view including each of the crop regions may be determined by an optimization process. The optimization process may be performed by the data processing device 20, or by a remote device.

In order to reduce computational time and space requirements, possible candidates for the arrangement of the layout (e.g. arrangement of rectangles in a grid) may be determined (e.g. identified) before determining the arrangement of the layout from the limited number of possible candidates for the arrangement for the layout. In particular, possible candidates for the aspect ratios of the rectangles in the layout are determined.

Determining possible candidates for the arrangement of the layout includes determining (e.g. identifying) all possible candidates for the arrangement of the layout, and then limiting the number of possible candidates.

Limiting the possible candidates for the arrangement of the layout may include limiting the possible candidates to possible candidates having a set of predefined aspect ratios of each rectangle in the layout.

When the method comprises the cost optimization process, such that the cost function is minimized using constrained optimization, the constraints may relate to one or more of the optimized aspect ratio of each rectangle in the layout, a predetermined point (e.g. a top left corner of the layout), and a scaling factor, wherein the scaling factors is an amount by which each crop region is scaled in size to fit a respective rectangle in the layout forming the composite view.

Figure 5:
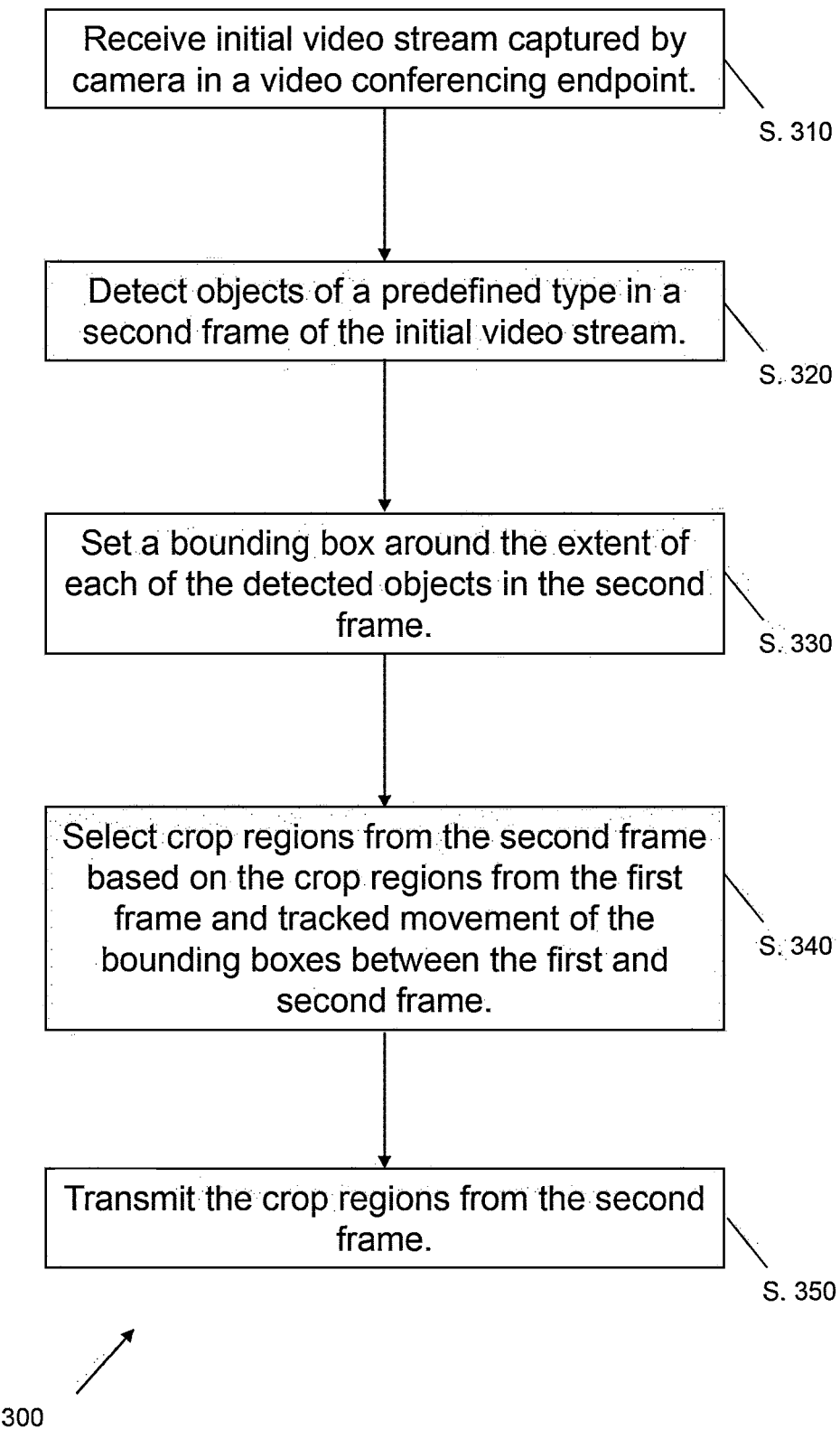
FIG. 5 shows steps of a method for selecting crop regions from a second frame of an initial video stream captured by a camera in a video conferencing endpoint.

FIG. 5 shows steps of a method 300, performed by the data processing device 20, for selecting crop regions from subsequent (e.g. a second, third, fourth . . . Nth) frames of the initial video stream. In particular, FIG. 5 shows steps for selecting crop regions from a second frame of the initial video stream.

As in S.110 of method 100, in S.310, the receiver 21 receives the initial video stream captured by camera 30 in video conferencing endpoint 10a. In S.320 and S.330 respectively, the object detection unit 22 detects objects of one or more predefined types in the second frame of the initial video stream, and the bounding box setting unit 23 sets a bounding box around the extent of each of the detected objects in the second frame. As such, each bounding box in the second frame may include a single object of a predefined type. S.320 and S.330 may be performed in a corresponding way to S.120 and S.130 as described above with reference to FIG. 3.

In contrast to S.140, in S.340, crop regions from the second frame of the initial video stream are selected based on the crop regions from the first frame and tracked movement of the bounding boxes between the first and second frame. Accordingly, the computational load of the cropping unit 24 is reduced compared to a method in which crop regions from the second and each subsequent frame are selected in the same way as the first frame, but a consistent view of the objects of the one or more predefined types is provided even if they move during the initial video stream.

Preferably, the number of crop regions in the first and second (and any subsequent frames) is consistent, and each crop region from the second frame (and any subsequent frame) includes the same object(s) of a predefined type as the corresponding crop region from the first frame. This provides a consistent view of the objects of the one or more predefined types and crop regions.

In S.140, the movement of the bounding boxes between the first and second frame may be tracked using a feature mapping algorithm, or by employing an optical flow estimation algorithm to track movement of pixels in each bounding box. Alternatively/additionally, each bounding box in the second frame may be identified as corresponding with a bounding box in the first frame based on location information of the bounding boxes in each frame, wherein bounding boxes which have shifted in location by the smallest distance between the first frame and the second frame are identified as corresponding pairs of bounding boxes. Accordingly, crop regions from the second frame may then be selected based on the corresponding pairs of bounding boxes so that each crop region in the second frame includes the same bounding boxes as the corresponding crop region in the first frame.

Similarly to S.150, in S350, the crop regions from the second frame are then transmitted by the transmitter 25.

Figure 6:
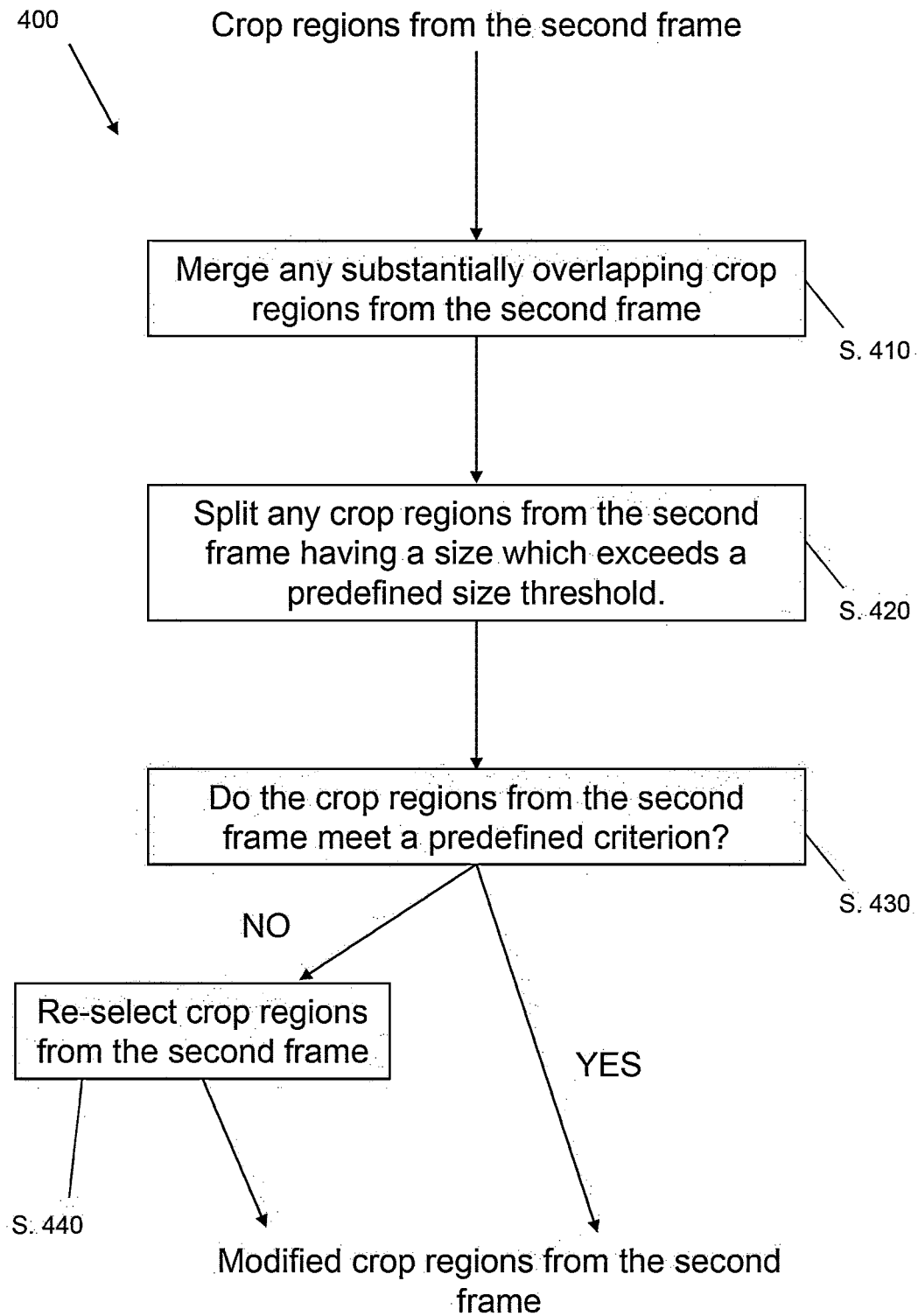
FIG. 6 shows a method comprising additional steps which can be performed in the method of FIG. 5.

FIG. 6 shows a method 400 comprising additional steps which may be performed between S.340 and S.350 in FIG. 5. Method 400 may be performed by the data processing device 20. The steps shown in FIG. 6 may be performed in any order, or simultaneously (e.g. S.420 may be performed before, simultaneously, or after S.410).

In S.410, any substantially overlapping crop regions from the second frame are merged, in order to avoid duplication of the objects of the one or more predefined types (e.g. people) in the second frame. In particular, an amount of overlap between a pair of crop regions from the second frame is determined, and the pair of crop regions are merged if the amount of overlap exceeds a predefined overlap threshold.

In S.420, any crop regions from the second frame which are too large (e.g. where a crop region includes two people and the two people have moved further apart between the first and second frame) are split into two or more resulting crop regions. In particular, a size of each crop region from the second frame is determined, and any crop region from the second frame having a size which exceeds a predefined size threshold is split into two or more resulting crop regions.

At S.430, it is determined whether the crop regions from the second frame meet a predefined criterion. In particular, if the crop regions do not meet the predefined criterion, it is determined that too much movement of the objects of the predefined types has occurred between first frame and the second frame, and that the crop regions from second frame must be re-selected using one of the methods discussed above for selecting the crop regions from the first frame. Accordingly, in S.440, if the crop regions from the second frame do not meet the predefined criterion, the crop regions from the second frame are re-selected, using the methods described above that are used when selecting the crop regions from the first frame (e.g. by a cost function).

The step of determining whether the crop regions from the second frame meet the predefined criterion may be performed according to a metric, wherein the metric may be the return value of the cost function described above. In particular, the predefined criterion may be that the metric is less than a predefined threshold.

As shown in FIG. 6, if the crop regions do meet the predefined criterion, they are not re-selected.

Crop regions from further subsequent frames (e.g. a third, fourth, fifth . . . Nth frame) of the initial video stream may be selected in a corresponding way as the second frame, as described above with reference to FIGS. 5 and 6.

A further example of a method for portioning a number of bounding boxes, and therefore assigning people, into separate final video streams, given a maximum number of final video streams, NS, is now described.

In a first step, a maximum number of final video streams is temporarily set to infinity. The method as described above is then run to obtain a set of crop regions in the initial frame. This will, often, produce non-overlapping crop regions where persons inside a crop region are overlapping or very close to each other and each crop region tightly bounds their respective person. If the set of crop regions has more than NS crop regions, then these crop regions are grouped into N groups such that each group has a similar or same number of bounding boxes/persons within it. The crop regions in each group are selected so that they are spatially close, and the groups maintain their spatial order of persons among groups, if possible. If the number of persons/bounding boxes is NP, then the target number of persons per group may be NPG=(NP+NS−1)/NS. In one example, the algorithm may include first ordering the crop regions by their spatial order, such as left to right, and then iteratively going through the remaining crop regions and, if a crop regions contains exactly or more than NPG persons or if there is no pending group (i.e. with less than NPG persons), then a new group is made containing only all the persons/bounding boxes in that crop region. Otherwise all persons/bounding boxes in that crop region are added to that pending group, and the group pending status is updated. Each final group contains a set of persons/bounding boxes for each stream.

After partitioning into a set of separate streams, each stream includes a set of bounding boxes, the algorithm discussed above with reference to FIG. 4 can be applied for each stream to obtain a set of crop regions compiled into a composite view. For each subsequent frame, the method may track if a separate stream is created or destroyed as people enter or leave the field of view of the camera or movement causes significant overlap in crop regions. The availability of created final video streams or unavailability of destroyed final video streams may be signalled or advertised over the network. Excessive signalling can be avoided by re-using a unique identifier of now destroyed streams for newly created streams. When there are many created streams or destroyed streams at the same time, the method may find the closest pairs for reused identifiers to avoid excessive change in the content of streams with the same identifier. A metric used for determining closeness may be the size of the set of identical persons/bounding boxes.

A transition in each final video stream, when its number of crop regions changes, may be animated to avoid abrupt changes. The transition in some examples is a fading over a period of time.

As discussed previously, each final video stream may be exposed as a camera or virtual camera so that an application can stream them independently and with the same standard interface. Metadata may be transmitted with each final video stream, the metadata containing information on spatial ordering, whether the active speaker is located within the respective stream, and the number of people within a given stream so as to allow more advanced layouts both at the sender and receiver side. The metadata may be associated with respective virtual cameras and/or frames produced from these virtual cameras. Most receivers have some static and some dynamic information associated with a camera to which it is subscribed. Static information does not change per produced frame. The static information for virtual cameras may include indicating which physical camera the respective virtual camera is derived from. The dynamic information per frame may indicate an active speaker present, and the number of persons within the frame. The dynamic information per frame may also include spatial ordering information of the final video stream, such as an order from left to right or information about the crop coordinates used to make the respective frame. In one example, the receiver may be running the Android® operating system and static information may be stored in camera characteristics metadata whilst dynamic information may be stored in the camera capture result metadata.

The background in a given crop region or frame may be blurred or replaced to avoid a cluttered view due to cropping reducing the overlap between close by crop regions. The mask for each person may be retrieved either from a depth sensor or a pre-trained machine learning model. An enhancement may be performed of the active speaker within a final video stream, e.g. by making them more prominent in the composite view. The active speaker, as discussed previously, may be detected via a microphone array which computes a sound direction and matches that sound direction with the identified presence of a person. The separate stream containing that person can then be identified, and a larger layout can be assigned for that person in the final composite view of that separate stream.

Figure 7A:
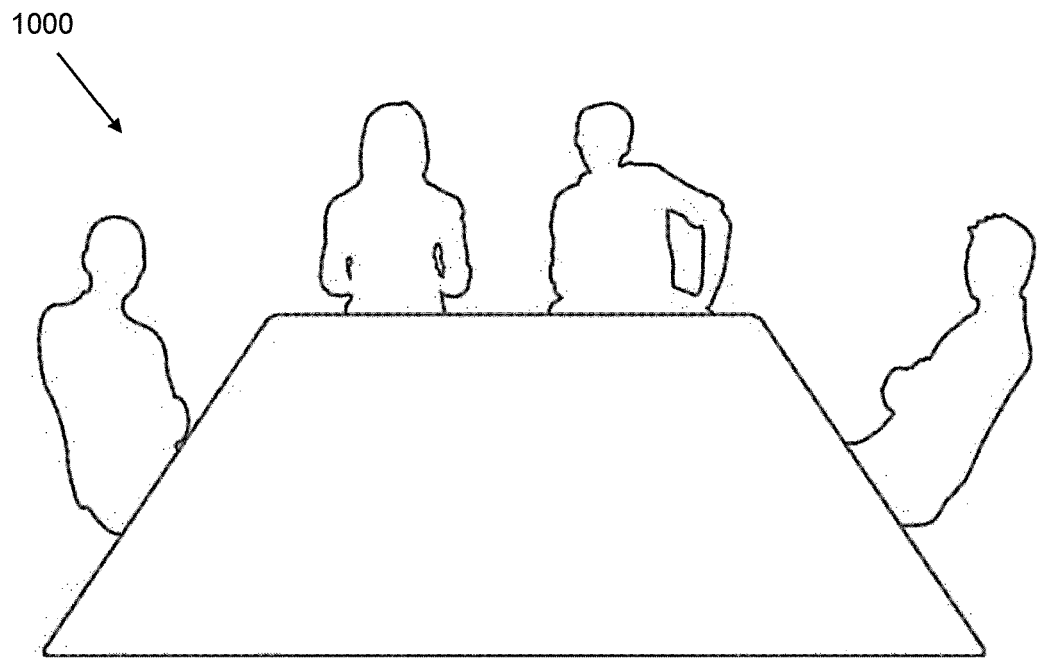
FIG. 7a shows an example first frame of an initial video stream.

FIG. 7a shows a first frame 1000 of an initial video stream captured by a camera, such as camera 30 of FIG. 1. The camera's field of view includes four people. As such, if the first frame 1000 of the initial video stream were to be transmitted to multiple video conferencing endpoints, such as video conferencing endpoints 10a-10d, then a first frame of a final video stream rendered and displayed at the video conferencing endpoints would include each of the four people, but they would not be positioned at an optimal distance from the camera, such that each person would look smaller than if each person had a dedicated camera. In particular, the first frame of the final video stream would look like the first frame 1000.

However, if the first frame 1000 of the initial video stream is manipulated into crop regions of interest in accordance with the methods disclosed herein, then any regions including a person are emphasised when rendered and displayed at the video conferencing endpoints. In particular, FIG. 7c shows four crop regions 1200a-d which can then be displayed at the video conferencing endpoints. The four crop regions 1200a-d emphasise the four people, such that any regions of the first frame 1000 not including a person are reduced from the final video stream.

Figure 7B:
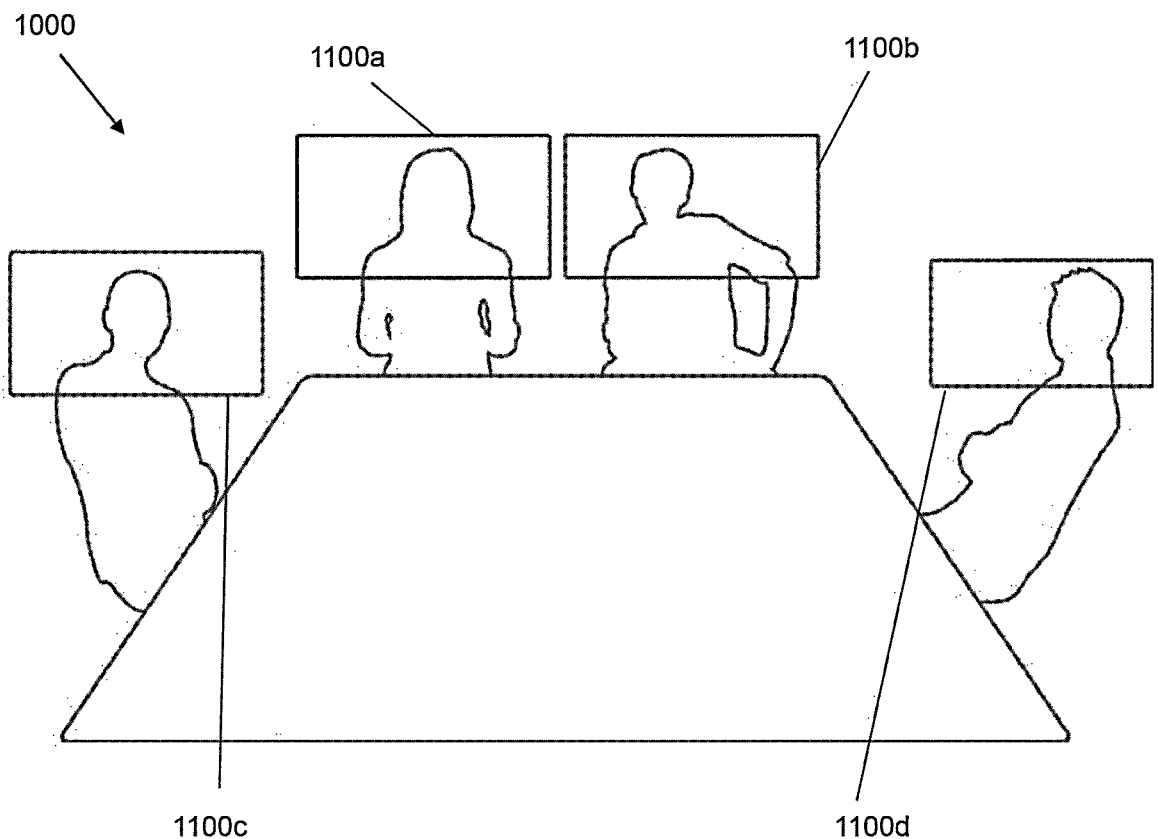
Figure 7C:
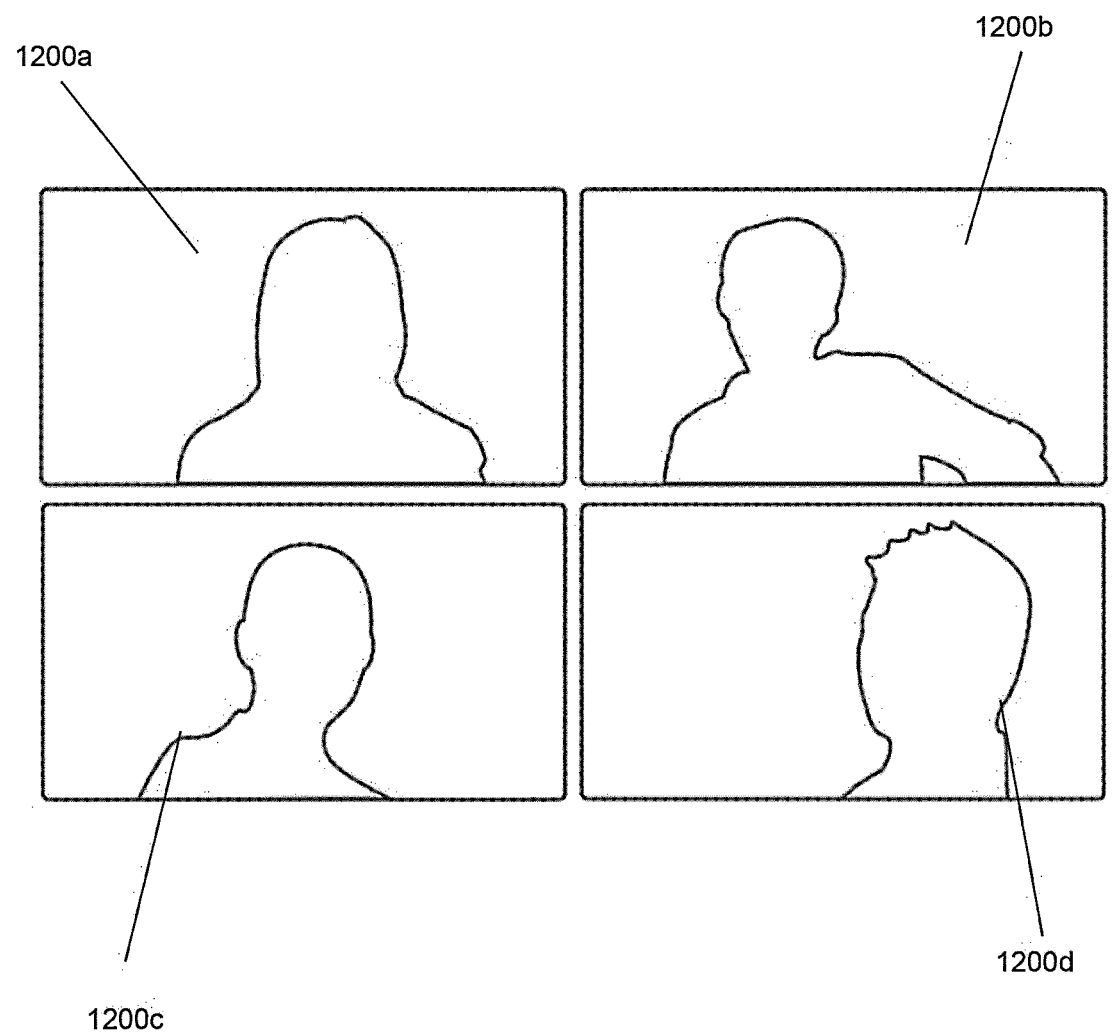

FIG. 7b shows example bounding boxes 1100a-d which are set around the extent of each object of a predefined type (in this case, a fixed ratio of the head and shoulders of a person). These bounding boxes are used in the selection of the crop regions.

In FIG. 7c, each crop region includes a single bounding box, and therefore a single person.

As mentioned above, the crop regions may be transmitted as separate first frames of separate final video streams, or as a composite view forming a single first frame of a single final video stream, wherein the composite view includes each of the crop regions.

The crop regions may be compiled into a composite view which is transmitted as a single first frame of a single final video stream. As can be seen with reference to FIGS. 7a-7c, the relative spatial order, or relative positions, of the people in the first frame 1000 of the initial video stream (shown in FIG. 7a) may be maintained in the layout (e.g. grid) forming the first frame of the final video stream (shown in FIG. 7c). In this way, a person sitting on the left hand side of another person in the first frame 1000 of the initial video stream is still viewed as sitting on the left hand side of the another person in the layout forming the first frame of the final video stream.

Figure 8A:
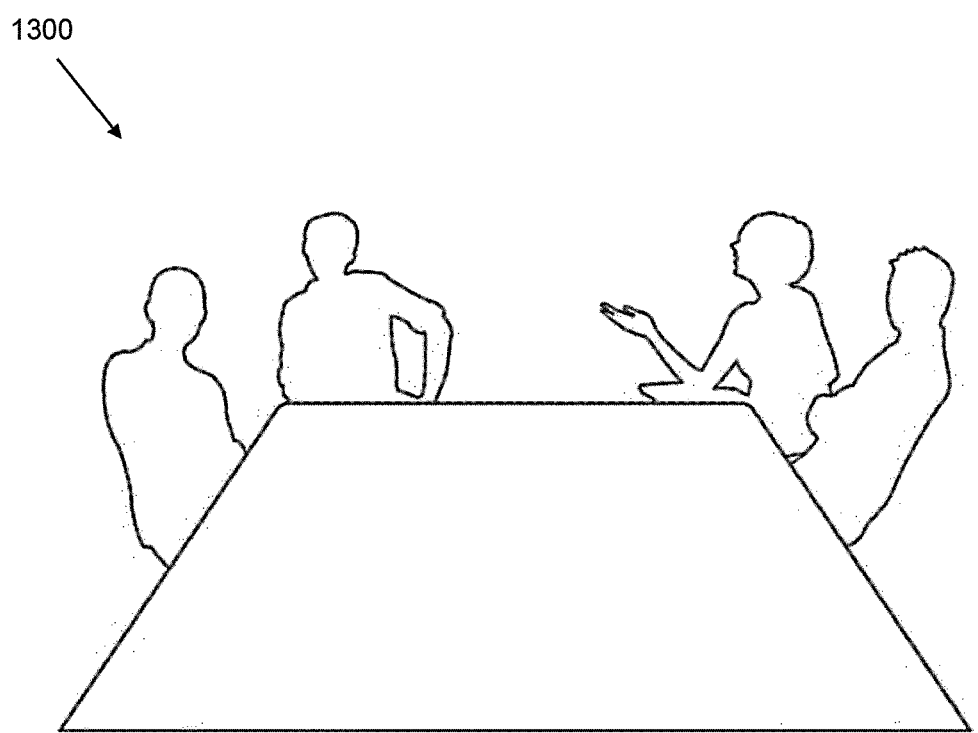
FIGS. 8a and 8b shows how a first frame of an initial video stream can be manipulated into crop regions, wherein each crop region includes a plurality of bounding boxes and therefore a plurality of objects of predefined types.
Figure 8B:
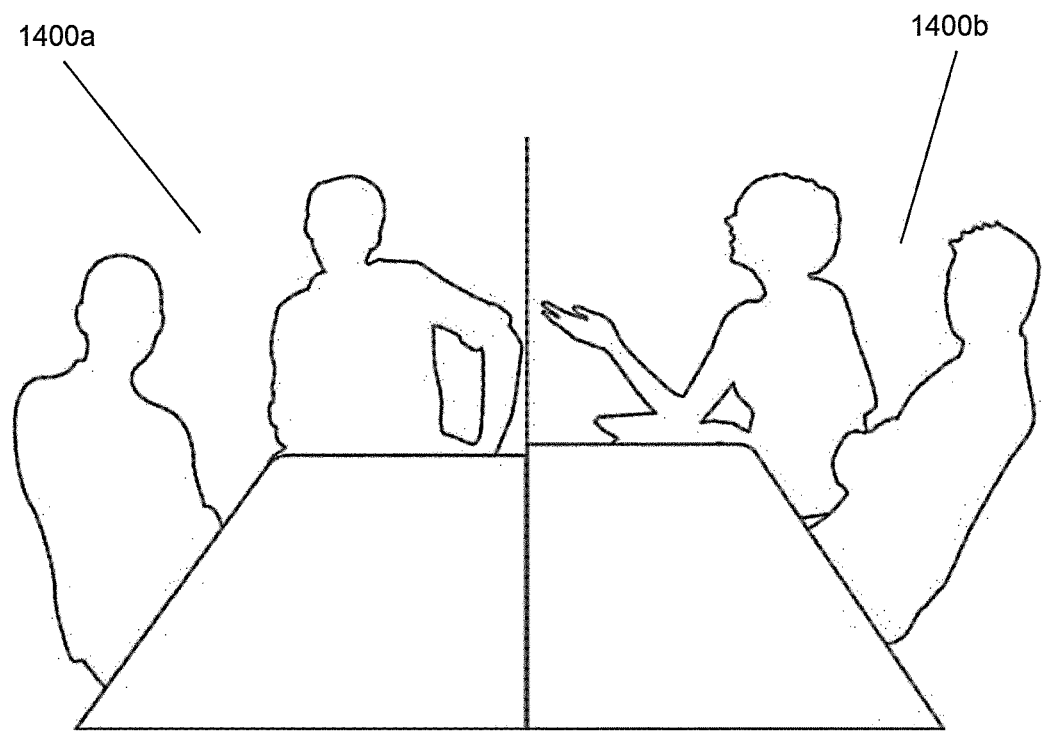

FIGS. 8a and 8b are similar to FIGS. 7a and 7c respectively, except that the first frame 1300 of the initial video stream captured by a camera (as shown in FIG. 8a) is manipulated into crop regions which each contain multiple (rather than only one) bounding box, and therefore multiple objects of a predefined type. In particular, as shown in FIG. 8b, two crop regions 1400a, 1400b are selected from the first frame 1300, wherein each crop region 1400a, 1400b includes two bounding boxes, and therefore two people.

Figure 9A:
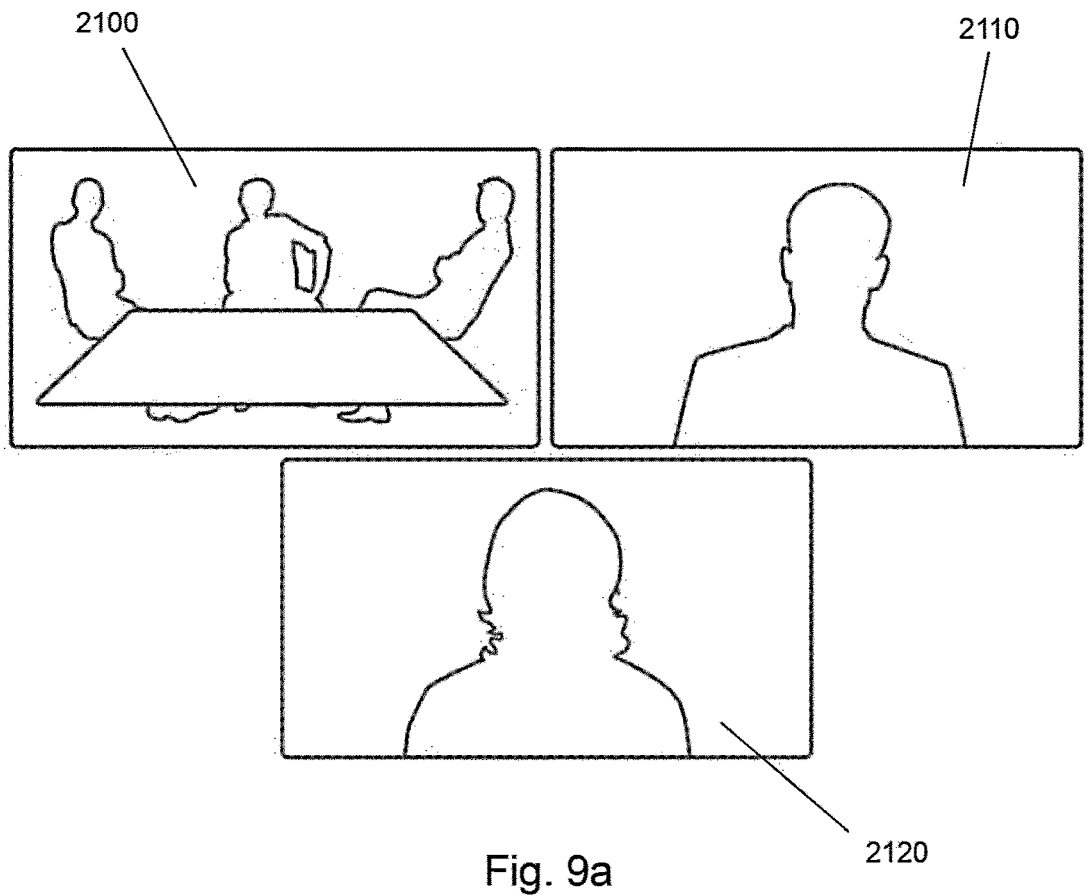
FIGS. 9a-9c illustrate the benefits of manipulating an initial video stream captured by a camera in a video conferencing endpoint into multiple views corresponding to regions of interest.
Figure 9B:
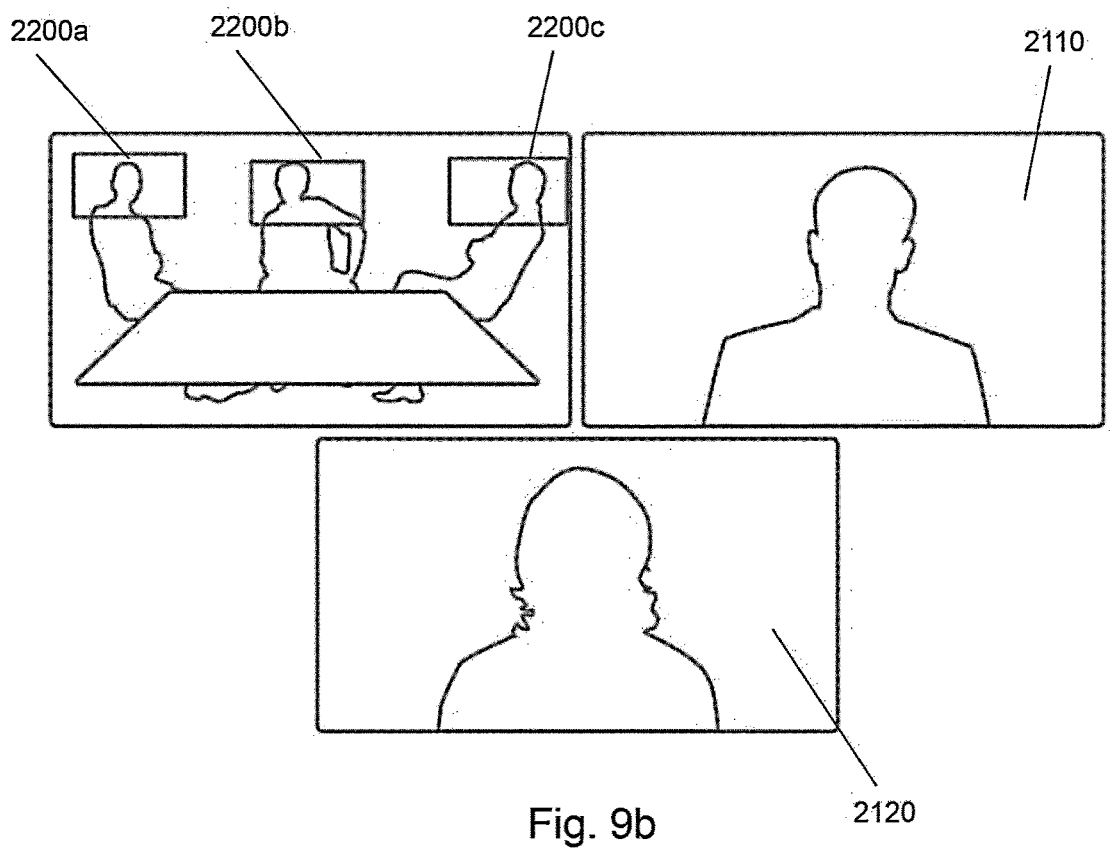
Figure 9C:
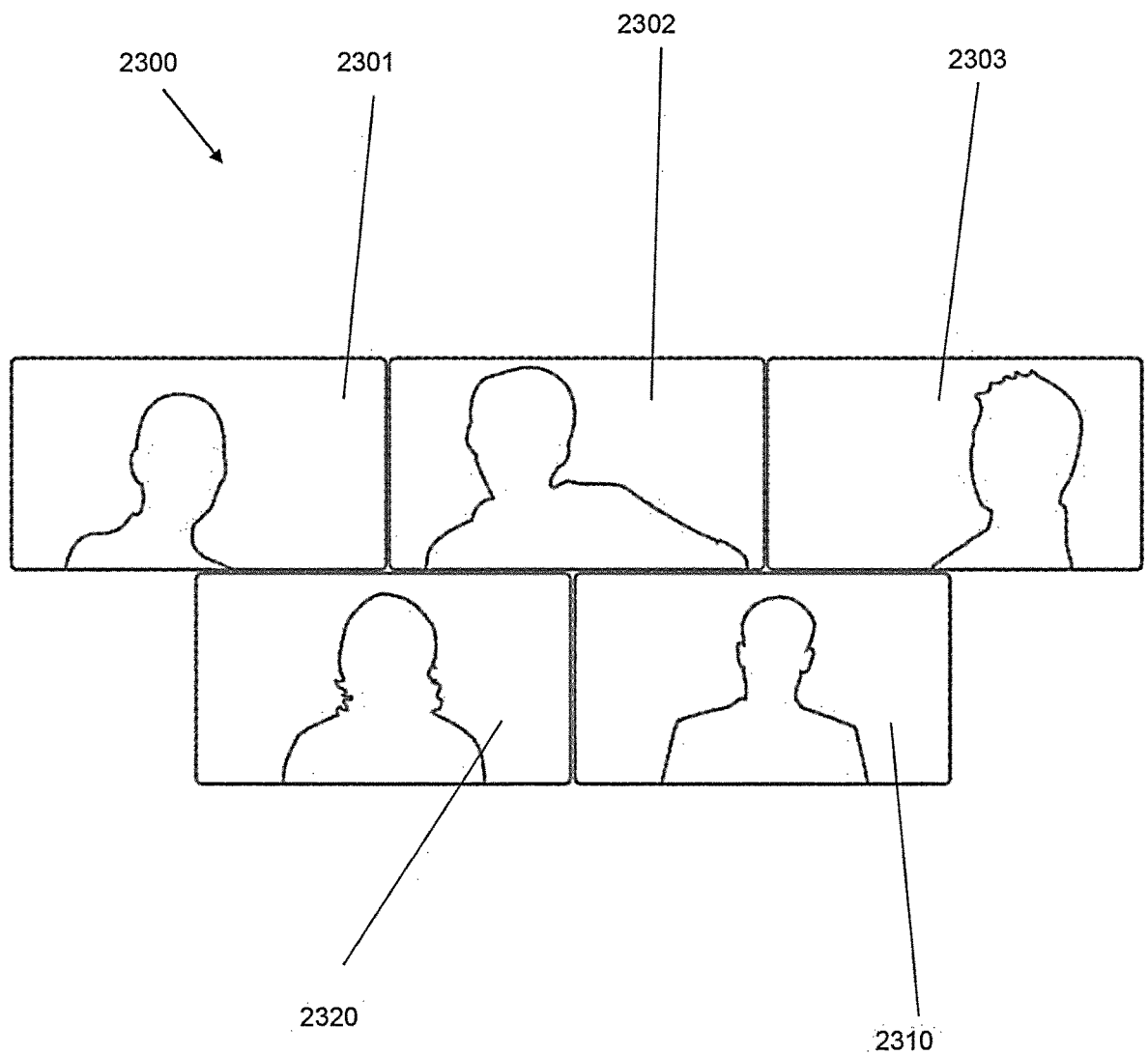

FIGS. 9a-9c illustrate the benefits of manipulating an initial video stream captured by a camera in a video conferencing endpoint into multiple views corresponding to regions of interest. In particular, in FIG. 9a, there are three video conferencing endpoints involved in a video conferencing call, each shown by a respective initial video stream 2100, 2110, and 2120. Initial video streams 2110 and 2120 each include a single person, such that a single person is located in the field of view of a camera located at the corresponding video conferencing endpoint. However, initial video stream 2100 includes three people, because three people are located in the field of view of a camera located at the corresponding video conferencing endpoint. As can be seen in FIG. 9a, the three people in the initial video stream are displayed smaller than the people in initial video streams 2110 and 2120.

In accordance with the method disclosed herein, crop regions of the initial video stream 2100 are selected in order to emphasise the three people in the initial video stream 2100. FIGS. 9b and 9c illustrate how crop regions of each frame of the initial video stream 2100 are selected to extract crop regions of interest 2200a-c (i.e. extract the three regions of each frame of the initial video stream 2100a including a person).

Accordingly, FIG. 9c shows an example display 2300 of respective frames of the final video streams corresponding to the initial video streams 2100, 2110, 2120. Final video streams 2310 and 2320 correspond to initial video streams 2110, 2120 respectively. However, initial video stream 2100 is partitioned into three final video streams 2301, 2302, 2303, each of which corresponds to a crop region 2200a-c of the initial video stream 2100. Accordingly, each person is viewed as a similar size when displayed at a video conferencing endpoint regardless of the number of people at each video conferencing endpoint and their distance to the camera.

Figure 10A:
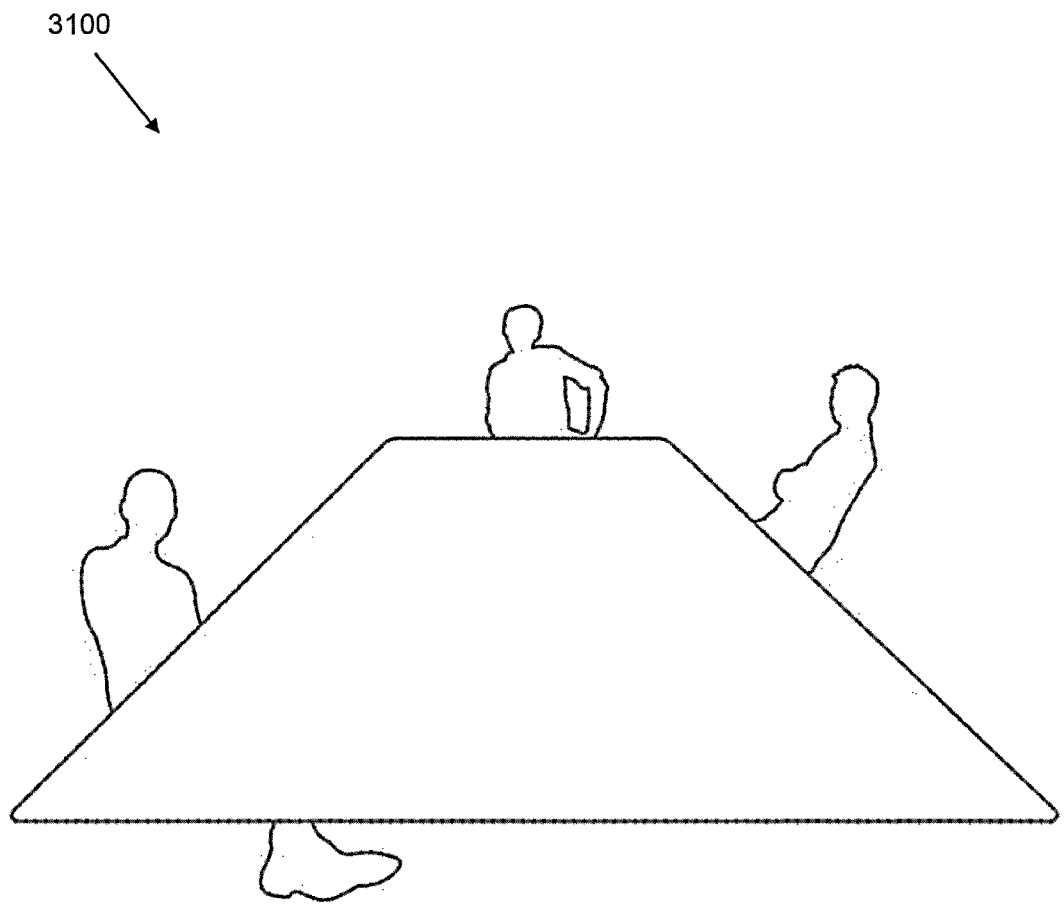
FIG. 10a shows an example frame of an initial video stream.
Figure 10B:
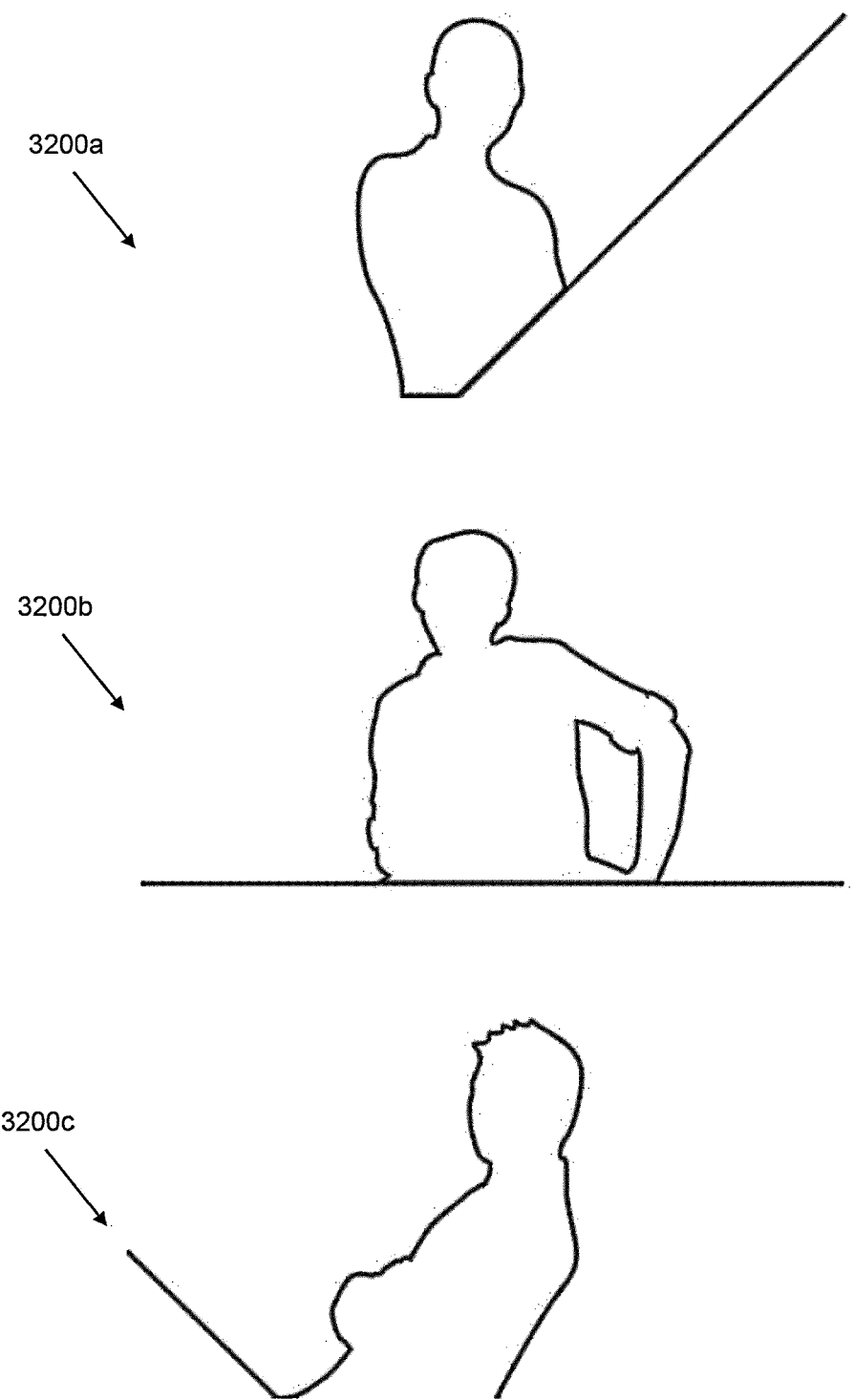
FIG. 10b shows example frames of final video streams.

FIGS. 10a and 10b illustrate a further example of a frame of an initial video stream 3100, and frames of final video streams 3200a-3200c, respectively.

In the frame of the initial video stream 3100, there are three people, each positioned a different distance from a single camera such that the people are different sizes. However, according to the methods disclosed herein, multiple crop regions are selected from the frame of the initial video stream 3100 to emphasise the people in the frame of the initial video stream 3100 such that they are each viewed as a similar size when the crop regions 3200a-3200c are displayed at the video conferencing endpoints (as shown in FIG. 10b), regardless of the number of people at each video conferencing endpoint and their distance to the camera.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A method for manipulating an initial video stream captured by a camera in a video conferencing endpoint into multiple views corresponding to regions of interest, the method comprising:
   detecting objects of one or more predefined types in a frame of the initial video stream;
   selecting a plurality of crop regions from the frame of the initial video stream, each crop region including at least one bounding box, each bounding box including a detected object of a predefined type; and
   transmitting the plurality of crop regions;
   wherein the method comprises either:
      compiling a plurality of the crop regions into a composite view, and transmitting the composite view as a single frame of a single final video stream, wherein a relative spatial order of the objects of the one or more predefined types in the frame are maintained in a layout forming the frame of the final video stream; or
      transmitting each of the crop regions as a separate final video stream, each final video stream including metadata containing information on spatial ordering.

2. The method according to claim 1, wherein:
   each crop region is transmitted as a separate frame of a separate final video stream; or
   a plurality of the crop regions are compiled into a composite view, and wherein the composite view is transmitted as a single frame of a single final video stream.

3. The method of claim 1, wherein the step of detecting the objects of one or more predefined types in the frame is performed using a trained neural network, Haar Feature-based Cascade Classifiers, or a Histogram of Oriented Gradients.

4. The method of claim 1, wherein the step of selecting a plurality of crop regions from the frame comprises:
   reducing areas of the crop regions not overlapping any bounding boxes; and
   reducing an overlap between the crop regions.

5. The method according to claim 4, wherein the step of selecting a plurality of crop regions from the frame of the initial video stream comprises parametrising each crop region by minimizing a cost function, wherein the cost function comprises a weighted sum of (i) a term correlated to areas of the crop regions not overlapping any bounding boxes; and (ii) a term correlated to the overlap between the crop regions.

6. The method according to claim 5, wherein the step of selecting a plurality of crop regions from the frame of the initial video stream comprises determining possible candidate sets of crop regions before minimizing the cost function, wherein the step of determining the possible candidate sets comprises one or more of:
   identifying all possible candidate sets of crop regions that satisfy a predefined preferred aspect ratio of each crop region;
   limiting the possible candidate sets of crop regions to possible candidate sets where each crop region in the candidate set includes less than, or equal to, a predefined number of bounding boxes;
   limiting the possible candidate sets of crop regions to possible candidate sets where all bounding boxes are included in the crop regions; and limiting the possible candidate sets of crop regions such that the number of crop regions in each possible candidate set is:
if each crop region is transmitted as a separate frame of a separate final video stream less than, or equal to, a predefined maximum number of final video streams; or
if the crop regions are compiled into a composite view and the composite view is transmitted as a single frame of a single final video stream, less than, or equal to, a predefined maximum number of rectangles in a layout forming a composite view.

7. The method according to claim 5, wherein the cost function is optimized in a cost optimization process, with respect to one or more constraints relating to one or more of: a predefined maximum number of final video streams, a predefined maximum number of rectangles in a layout forming a composite view of crop regions, the predefined number of bounding boxes, and a predefined preferred aspect ratio of each crop region.

8. The method of claim 1, further comprising:
detecting objects of the one or more predefined types in a subsequent frame of the initial video stream;
setting a bounding box around an extent of each of the detected objects of the one or more predefined types in the subsequent frame of the initial video stream; and
selecting crop regions from the subsequent frame of the initial video, based on the crop regions from the frame, and movement of the bounding boxes between the frame and the subsequent frame.

9. The method according to claim 8, further comprising:
determining an amount of overlap between a pair of crop regions from the subsequent frame; and
merging the pair of crop regions from the subsequent frame, if the amount of overlap exceeds a predefined overlap threshold.

10. The method according to claim 8, further comprising:
determining a size of a crop region from the subsequent frame; and
splitting the crop region from the subsequent frame into two or more resulting crop regions if the size exceeds a predefined size threshold.

11. The method of claim 1, wherein an arrangement of the layout is determined by an optimization process based on an aspect ratio of each crop region selected from the frame of the initial video stream and/or on a predefined preferred aspect ratio of each crop region.

12. A data processing device for manipulating an initial video stream captured by a camera in a video conferencing endpoint into multiple views corresponding to regions of interest in accordance with the method of claim 1, the data processing device comprising:
a receiver configured to receive a frame of the initial video stream captured by the camera;
an object detection unit configured to detect objects of one or more predefined types in the frame of the initial video stream;
a cropping unit configured to select a plurality of crop regions from the frame of the initial video stream, each crop region including at least one bounding box, each bounding box including a detected object of a predefined type; and
a transmitter configured to transmit the plurality of crop regions either:
as a composite view in a single frame of a final video stream, the composite view formed by compiling the plurality of crop regions into the composite view, wherein a relative spatial order of the objects of the one or more predefined types in the frame are maintained in a layout forming the frame of the final video stream; or
as separate final video streams, each final video stream including metadata containing information on spatial ordering.

13. The data processing device of claim 12, wherein:
the receiver is configured to receive the initial video stream, wirelessly or via a wired connection, from the video conferencing endpoint having the camera or directly from the camera; and
the transmitter is configured to transmit, wirelessly or via a wired connection, the plurality of crop regions to one or more video conferencing endpoints for rendering and display at/by the one or more video conferencing endpoints.

14. A video conferencing system for manipulating an initial video stream into multiple views corresponding to regions of interest, the system comprising:
a camera configured to capture an initial video stream;
one or more video conferencing endpoints; and
a data processing device configured to perform the method of claim 1, the data processing device comprising:
a receiver configured to receive a frame of the initial video stream captured by the camera;
an object detection unit configured to detect objects of one or more predefined types in the frame of the initial video stream;
a cropping unit configured to select a plurality of crop regions from the frame of the initial video stream, each crop region including at least one bounding box, each bounding box including a detected object of a predefined type; and
a transmitter configured to transmit the plurality of crop regions to the one or more video conferencing endpoints either:
as a composite view in a single frame of a final video stream, the composite view formed by compiling the plurality of crop regions into the composite view, wherein a relative spatial order of the objects of the one or more predefined types in the frame are maintained in a layout forming the frame of the final video stream; or
as separate final video streams, each final video stream including metadata containing information on spatial ordering.

15. The system of claim 14, wherein the one or more video conferencing endpoints are configured to render and display the crop regions as separate frames of separate final video streams, or in a composite view in a single frame of a final video stream.

* * * * *